United States Patent
Nakayama et al.

(10) Patent No.: US 11,775,176 B2
(45) Date of Patent: Oct. 3, 2023

(54) TERMINAL DEVICE, DATA MANAGEMENT SYSTEM, AND SERVER DEVICE

(71) Applicant: Wacom Co., Ltd., Saitama (JP)

(72) Inventors: Yoshitaka Nakayama, Kanagawa (JP); Ryoichi Kikuchi, Chiba (JP); Isao Maruoka, Gunma (JP)

(73) Assignee: Wacom Co., Ltd., Saitama (JP)

( * ) Notice: Subject to any disclaimer, the term of this patent is extended or adjusted under 35 U.S.C. 154(b) by 869 days.

(21) Appl. No.: 15/489,286

(22) Filed: Apr. 17, 2017

(65) Prior Publication Data

US 2017/0220277 A1 Aug. 3, 2017

Related U.S. Application Data

(63) Continuation of application No. PCT/JP2014/078703, filed on Oct. 29, 2014.

(51) Int. Cl.
*G06F 16/17* (2019.01)
*G06F 3/06* (2006.01)
*G06F 16/178* (2019.01)
*G06F 13/00* (2006.01)

(52) U.S. Cl.
CPC ............ *G06F 3/0619* (2013.01); *G06F 3/065* (2013.01); *G06F 3/067* (2013.01); *G06F 13/00* (2013.01); *G06F 16/178* (2019.01); *G06F 16/1794* (2019.01); *G06F 16/1787* (2019.01)

(58) Field of Classification Search
CPC ............................ G06F 3/0619; G06F 16/1794
See application file for complete search history.

(56) References Cited

U.S. PATENT DOCUMENTS

| | | | |
|---|---|---|---|
| 6,202,100 B1 | 3/2001 | Maltby et al. | |
| 6,883,142 B2 | 4/2005 | Shimamoto et al. | |
| 7,158,675 B2 | 1/2007 | Gounares et al. | |
| 8,082,189 B2 | 12/2011 | Fushimi et al. | |
| 8,676,934 B2 | 3/2014 | Takakura | |
| 8,726,343 B1 * | 5/2014 | Borzycki ............ | G06F 21/6218 726/1 |
| 9,571,433 B2 | 2/2017 | Osuka et al. | |

(Continued)

FOREIGN PATENT DOCUMENTS

JP 7-271735 A 10/1995
JP 9-198488 A 7/1997

(Continued)

*Primary Examiner* — Son T Hoang
(74) *Attorney, Agent, or Firm* — Seed IP Law Group LLP

(57) ABSTRACT

A terminal device uploads data to a storage device. The terminal device includes a processor and a memory storing instructions that cause the device to determine whether data to be uploaded is a file or a partial dataset being used by an application, determine whether one or more data objects created in a given format is included in the data to be uploaded determined to be the partial dataset, generate image data and a shared byte string from the data to be uploaded if the data objects created in the given format are included in the data to be uploaded, send the data to be uploaded to the storage device as shared data if the data to be uploaded is the file, and send the image data and the shared byte string to the storage device as the shared data if the data to be uploaded is the partial dataset.

19 Claims, 13 Drawing Sheets

(56) References Cited

U.S. PATENT DOCUMENTS

| | | | | |
|---|---|---|---|---|
| 2002/0138653 A1* | 9/2002 | Ogura | ............... | G06F 9/543 |
| | | | | 709/246 |
| 2012/0096368 A1* | 4/2012 | McDowell | ............ | G06F 9/543 |
| | | | | 715/748 |
| 2013/0246529 A1* | 9/2013 | Salesky | ............. | H04L 12/1822 |
| | | | | 709/204 |
| 2014/0122591 A1* | 5/2014 | Roche | ............... | G06F 16/1834 |
| 2014/0267339 A1* | 9/2014 | Dowd | ................ | H04M 1/00 |
| | | | | 345/581 |

FOREIGN PATENT DOCUMENTS

| | | |
|---|---|---|
| JP | 2001-282732 A | 10/2001 |
| JP | 2002-288124 A | 10/2002 |
| JP | 2006-53872 A | 2/2006 |
| JP | 2010-20795 A | 1/2010 |
| JP | 2010-187217 A | 8/2010 |
| JP | 2013-77299 A | 4/2013 |
| WO | 2009/075043 A1 | 6/2009 |

* cited by examiner

FIG.14A

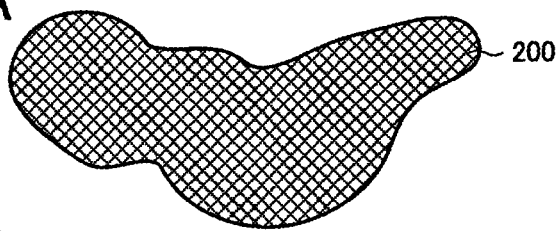

FIG.14B

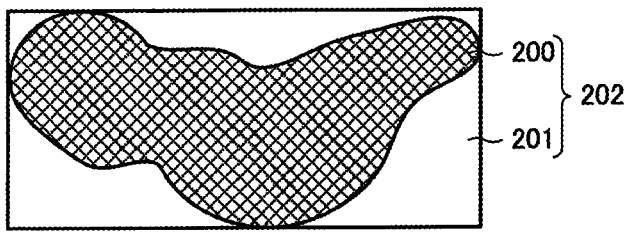

FIG.14C

```
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCD                           234567890
ABCD                           234567890
ABCD                           234567890
ABCD                           234567890
ABCD                           234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
```

FIG.14D

```
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCDE    LMNOPQRST        234567890
ABCD                       234567890
ABCDE                  XYZ1234567890
ABCDEFG               WXYZ1234567890
ABCDEFGHIJKLM        VWXYZ1234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
ABCDEFGHIJKLMNOPQRSTUVWXYZ1234567890
```

TERMINAL DEVICE, DATA MANAGEMENT SYSTEM, AND SERVER DEVICE

BACKGROUND

Technical Field

The present disclosure relates to a terminal device, a data management system, and a server device, and more particularly, to a terminal device, a data management system, and a server device that permit sharing of data stored in a clipboard among a plurality of terminals.

Description of Related Art

One cloud computing system that has drawn attention in recent years is a file management system. The file management system is a system that allows user files to be saved in a server storage, and target files are synchronized between one or a plurality of user terminals and a server. Using the file management system makes it possible for a user to handle files without being aware of the terminals.

In the meantime, a general terminal operating system includes a temporary storage area for sharing data between applications called a clipboard or pasteboard (hereinafter collectively referred to as a "clipboard"). Using a clipboard, the user can pass data being used (e.g., image data being drawn) in an application to other applications through a simple operation.

Patent Document 1 and Patent Document 2 disclose technologies that have permitted sharing of data in a clipboard between a plurality of terminals. Also, Patent Document 3 discloses a technology for performing image processing on image data to match with a type of an application to which image data is transferred when image data is transferred between applications in a single terminal using a clipboard. Patent Document 4 discloses a technology for copying and pasting electronic ink information via a clipboard.

PRIOR ART DOCUMENTS PATENT DOCUMENTS

Patent Document 1: Japanese Patent Laid-Open No. Hei 7-271735
Patent Document 2: Japanese Patent Laid-Open No. 2002-288124
Patent Document 3: Japanese Patent Laid-Open No. 2006-053872
Patent Document 4: Japanese Patent Laid-Open No. 2010-020795

BRIEF SUMMARY

Technical Problems

Incidentally, recent years have seen increasing use of image drawing software using an electronic pen not only on personal computers (PCs) but also on portable tablet terminals. As a result, user demand for transferring image data being drawn on a portable tablet terminal to a PC through a simple operation or vice versa is growing.

Also, although data in a clipboard is originally designed to be used for temporary data exchange, there is a user demand for using data after a while such as using partial image data, drawn using a tablet terminal while commuting, after arriving at the office on a PC.

A possible way to meet such a demand is to build a data management system that accumulates data in a clipboard described above in a server to allow use of the data from a plurality of terminals. This makes it possible for the user to use image data from other terminals later by simply performing an operation of copying image data (operation of pasting image data to a clipboard) and an operation of transferring the copied image data to the server.

However, various and diverse types of data are stored in a clipboard. Some among such data should preferably be not accumulated in the above data management system. A detailed description will be given below.

In general, a clipboard stores two kinds of data. One of them is data being used in an application such as the above described image data being drawn (hereinafter referred to as "partial dataset"). This type of data is copied to be stored in the clipboard as the user performs a copying operation (e.g., operation of selecting an image area and pressing a copy button in the case of drawing software) on an application's user interface. The other type of data is information indicating a file (hereinafter referred to as "file information"). This type of data is copied to be stored in the clipboard as the user performs a copying operation (e.g., operation of pressing Ctrl and C with a file selected in the case of WINDOWS (registered trademark) in an operating system's file manager.

A file is data whose rule patterns are limited in number to a certain degree based on a standardized format (file format) on the premise of permanent use. A computer can comprehend the application to process the file with its extension or file type. A human can guess or comprehend the file content by opening the file with the filename given to the file or the application associated with the file. Therefore, no problem occurs from the viewpoint of content management even if all file information is accumulated.

In contrast, partial dataset is data whose rule patterns exist in an approximately unlimited number based on a data structure defined freely by an application on the premise of only temporary use by volatile memory. A computer cannot identify the application to process partial dataset depending on the extension. Moreover, there is no way for a human to guess the content thereof because no filename is given thereto. Therefore, if all datasets are accumulated, this results in a warehouse having a huge amount of data that cannot be found out neither by the computer nor by the human. Storing unused data puts a burden on communication lines, leads to wasteful use of the storage area of the storage, and moreover, results in less ease of use for the user.

Therefore, it is an object of the present disclosure to provide a terminal device, a data management system, and a server device that permit accumulation of data stored in a clipboard regardless of whether the data is a file or a partial dataset.

More particularly, the object of the disclosure is to provide a terminal device, a data management system, and a server device that permit accumulation of data stored in a clipboard irrespective of the content of a target file if the data stored in the clipboard is file information, and, on the other hand, permit accumulation of the data only when at least one of one or more data objects included in the data is recognizable by a human if the data stored in the clipboard is not file information.

Technical Solution

A terminal device according to the present disclosure uploads data to a storage device that communicates with a server device. The terminal device includes a processor; and a memory coupled to the processor. The memory stores instructions that, when executed by the processor, cause the device to: determine whether data to be uploaded is a file or a partial dataset being used by an application, determine whether one or more data objects created in a given format configured to generate image data are included in the data to be uploaded that has been determined to be the partial dataset by the device, generate image data and a shared byte string from the data to be uploaded if the device determines that the one or more data objects are included in the data to be uploaded, send the data to be uploaded to the storage device as shared data if the determines that the data to be uploaded is the file, and send the image data and the shared byte string to the storage device as shared data if the device determines that the data to be uploaded is the partial dataset.

According to the present disclosure, if data stored in a clipboard is file information, the data can be accumulated irrespective of the content of the target file. On the other hand, if data stored in the clipboard is not file information, the data can be accumulated as long as the data or at least one of the data objects included in the data is recognizable by a human.

The terminal device may send the image data and the shared byte string to different storage positions of the storage device if the device determines that the data to be uploaded is the partial dataset. Also, the storage position where the image data is stored may be accessed by the server device to generate thumbnail information representing the content of the shared byte string, and the storage position where the shared byte string is stored may be accessed by the server device to share the shared byte string whose content is represented by the thumbnail information. This eliminates the need for a processing mechanism to extract image data from the shared data in the storage device, allowing for use of a general-purpose storage as a storage device.

Also, the terminal device may send, to the server device, mixed identification information indicating whether the shared data is the file or the partial dataset. According to this, it is possible for the server device to determine whether the data is the file or the partial dataset based on the mixed identification information.

Also, if the terminal device determines that the shared data is the partial dataset, the device acquires source information representing an application type and an operation system type and sends the source information to the server device separately from the shared byte string. According to this, it is possible for the server device to perform filtering based on the source information without reading all shared data from the storage device.

Also, the given format may be a raster data type format, and the terminal device may generate the image data based on one or more data objects created in the raster data type format. This permits reliable generation of image data by the terminal device.

The raster data type format may include at least one of a bitmap format, a joint photographic experts group (JPEG) format, a tag image file format (TIFF), and a graphics interchange format (GIF), and the terminal device may generate the image data in one of the bitmap format, the joint photographic experts group format, the tag image file format, and the graphics interchange format that is different from the given format. According to this, image data generated by the terminal device can be image data in another raster data type format.

Also, the terminal device may generate the image data in a format that permits transparency to be set as the other raster data type format. Also, the format that permits the transparency to be set may be a portable network graphics (PNG) format. This makes it possible to reliably generate image data by the terminal device.

Also, if the terminal device determines that one or more data objects are included in the data to be uploaded, the terminal device may generate rectangular image data that includes portions other than the one or more data objects included in the data to be uploaded as a background and generate, as the image data, raster data in which transparency is set for a background portion of the generated rectangular image data. According to this, it is possible to acquire, as image data, rectangular image data that includes the data objects included in the data to be uploaded and in which the portions other than the data objects are transparent.

Also, the above terminal device may generate the shared byte string based on portions excluding the data objects that are thumbnails of the one or more data objects included in the data to be uploaded. According to this, it is possible to exclude the thumbnails that are likely to have been created in an application-specific format from the shared data.

Also, the terminal device may acquire the data to be uploaded from a clipboard in response to a user operation that is different from an operation of updating data in the clipboard. According to this, it is possible to prevent transmission of shared data from the terminal device to the storage device an excessive number of times.

Also, a data management system according to the present disclosure may include a terminal device and a server device. The server device includes a first processor and a first memory coupled to the first processor. The terminal device includes a second processor and a second memory coupled to the second processor, the second memory storing instructions that, when executed by the second processor, cause the terminal device to acquire size information of the shared data before sending the shared data to a storage device and send the size information to the server device. The first memory stores instructions that, when executed by the first processor, causes the server device to confirm whether the storage device can store the shared data based on the size information and send information indicating a confirmation result to the terminal device. The second memory also stores instructions that, when executed by the second processor, cause the terminal device to send the shared data in accordance with the information. According to this, it is possible to configure the terminal device to send the shared data only if the storage device can store the shared data, thereby preventing useless transmission.

Also, in this data management system, the second memory may store instructions that, when executed by the second processor, cause the terminal device to send information indicating storage of the shared data in the storage device to the server device after sending the shared data to the storage device. According to this, it is possible to give a trigger to generate thumbnails from the terminal device to the server device.

Also, if the shared data received from the terminal device is the partial dataset, and if the shared data includes given vector data, the first memory may store instructions that, when executed by the first processor, causes the server device to convert the given vector data into general-purpose vector data that is compatible with different operating systems, the general-purpose vector data being different from the given vector data. According to this, it is possible to use vector data in an arbitrary terminal device irrespective of the operation system and the application installed.

Also, the shared data may include mixed identification information indicating whether the shared data is the file or the partial dataset, and the storage device may, in operation, store the mixed identification information and a portion of the shared data that is the file, or a portion of the shared data that is the shared byte string in separate storage positions. According to this, by referring to the mixed identification information, it is possible for the server device to determine whether the shared data is the file or the partial dataset.

Also, the shared data may include source information representing an application that created the shared data, and the storage device may be configured to store the source information and the portion of the shared data that is the file, or the portion of the shared data that is the shared byte string in separate storage positions. According to this, by referring to the source information, it is possible for the server device to determine the application that created the shared data.

A data management system according to another aspect of the present disclosure includes a terminal device having a first processor and a first memory coupled to the processor, a storage device, and a server device having a second processor and a second memory coupled to second processor. The first memory stores instructions that, when executed by the first processor, cause the terminal device to send a plurality of pieces of shared data each of which is a file or a partial dataset. The storage device, in operation, stores the plurality of pieces of shared data sent from the terminal device. The first memory stores instructions that, when executed by the first processor, cause the terminal device to send, to the server device, filter information indicating a filtering condition applicable to one or more of the plurality of pieces of shared data that are the partial datasets. The second memory stores instructions that, when executed by the second processor, cause the server device to select one or more of the plurality of pieces of shared data that are the partial datasets that satisfy the filtering condition and one or more of the plurality of pieces of shared data that are the files from among the plurality of pieces of shared data stored in the storage device, and present a list of the selected ones of the plurality of pieces of shared data to the terminal device. According to this, it is possible to exclude the partial datasets that cannot be used on the terminal device from the list presented to the terminal device by the server device.

The second memory may store instructions that, when executed by the second processor, cause the server device to present a list of files and partial datasets and include, at least for the partial datasets, thumbnails generated by the server device based on one or more data objects included in the partial datasets. According to this, it is possible for the terminal device to present, at least for the partial datasets, a list of the shared data including thumbnails to the user.

Also, the filtering condition may include source information indicating an application that created at least one partial dataset. According to this, it is possible to exclude partial datasets that were created using applications not installed in the terminal device from the list presented by the server device to the terminal device.

Also, the filtering condition may include source information indicating an operating system of the terminal device, and the second memory may store instructions that, when executed by the second processor, cause the server device to select the shared data created in the terminal device based on the operating system indicated by the source information from among the one or more of the plurality of pieces of shared data that are the partial datasets. According to this, it is possible to exclude partial datasets that were created elsewhere than in the terminal device where the same operation system as in the terminal device is installed as basic software from the list presented by the server device to the terminal device.

Also, the first memory may store instructions that, when executed by the first processor, cause the terminal device to select one or more of the plurality of pieces of shared data from the list presented by the server device and send selection information indicating the selected one or more of the plurality of pieces of shared data to the server device, and the second memory may store instructions that, when executed by the second processor, cause the server device to read the selected one or more of the plurality of pieces of shared data from the storage device based on the selection information sent from the terminal device, and send the selected one or more of the plurality of pieces of shared data to the terminal device. According to this, it is possible to download shared data to the terminal device.

Also, the first memory may store instructions that, when executed by the first processor, if the shared data that is the partial dataset is received from the server device, cause the terminal device to load the shared data into a clipboard and, if the shared data that is the file is received from the server device, cause the terminal device to copy the shared data to a given folder. According to this, it is possible to download shared data in a suitable manner to match with the type of the shared data.

Also, a server device according to the present includes a processor and a memory coupled to the processor, the memory storing instructions that, when executed by the processor, cause the server device to communicate with a terminal device and a storage device. The terminal device sends a plurality of pieces of shared data each of which is a file or a partial dataset. The storage device stores the plurality of pieces of shared data sent by the terminal device. The memory stores instructions that, when executed by the processor, cause the server device to select one or more of the plurality of pieces of shared data that are the partial datasets that satisfy a filtering condition and one or more of the plurality of pieces of shared data that are the files from among the plurality of pieces of shared data stored in the storage device, and present a list of the selected ones of the plurality of pieces of shared data to the terminal device.

Advantageous Effects

According to the present disclosure, if data stored in a clipboard is file information, the data can be accumulated irrespective of the content of a target file. On the other hand, if the data stored in the clipboard is not file information, the data can be accumulated as long as at least one of data objects included in the data is recognizable by a human.

BRIEF DESCRIPTION OF THE DRAWINGS

FIG. 14A is a diagram illustrating vector data 200 included in the partial dataset D2 illustrated in FIG. 1, FIG. 14B is a map 202 generated from the vector data 200 illustrated in FIG. 14A, FIG. 14C is a diagram illustrating an example in which an opaque color is set for a background portion 201 of the map 202 illustrated in FIG. 14B, and FIG. 14D is a diagram illustrating an example in which transparency is set for the background portion 201 of the map 202 illustrated in FIG. 14B.

DETAILED DESCRIPTION

A detailed description will be given below of preferred embodiments of the present disclosure with reference to the accompanying drawings.

Figure 1:
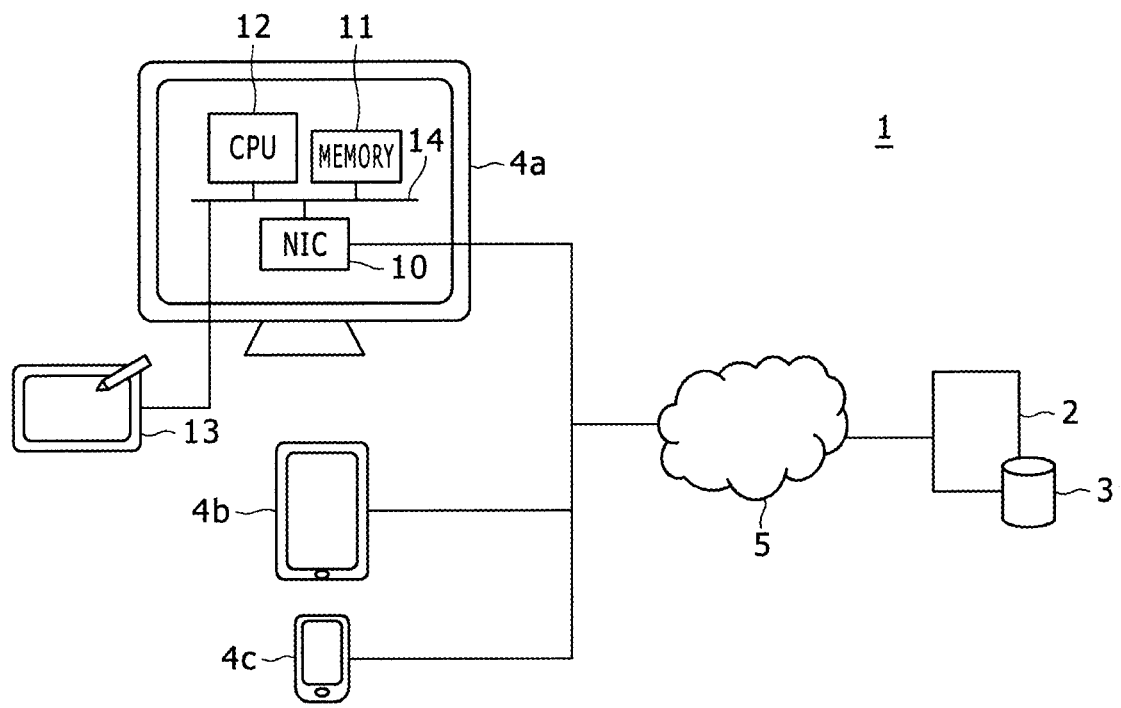
FIG. 1 is a diagram illustrating a system configuration of a data management system 1 according to a first preferred embodiment of the present disclosure.

A data management system 1 according to a first embodiment of the present disclosure is configured to include a server 2 (server device), a storage 3 (storage device), terminal devices 4a to 4c, and a network 5 as illustrated in FIG. 1.

The terminal device 4a is, for example, a desktop PC and configured to include a network interface card (NIC) 10, a memory 11, a central processing unit (CPU) 12 (i.e., a processor), a digitizer 13, and an internal bus 14. It should be noted that although the digitizer 13 is illustrated here as an example of input means, the terminal device 4a may have other input means such as a keyboard and a mouse. On the other hand, although not illustrated, the terminal device 4a is configured to include various output means such as display and speaker.

If the address of data flowing in the internal bus 14 is external, the network interface card 10 includes the function of taking in the data and outputting the data to the network 5. If the address of data flowing in the network 5 is the terminal device 4a, the network interface card 10 also includes the function of taking in the data and outputting the data to the internal bus 14.

The memory 11 is configured to include a main storage device including a volatile memory such as dynamic random access memory (DRAM) and an auxiliary storage device including a non-volatile memory such as hard disk. The memory 11 stores programs that define the operation of the CPU 12 and various data used by the CPU 12.

The programs stored in the memory 11 include a program for realizing an operation system, basic software of the terminal device 4a, programs for realizing various applications that run on the operation system (application programs), programs for realizing data input and output through the network interface card 10, and other programs.

On the other hand, various data stored in the memory 11 includes not only various types of files including binary files and text files but also data that is temporarily stored (temporarily stored data) for exchange between applications. This kind of data is stored in a clipboard that is a volatile area reserved in the memory 11. A description will be given later of details of the clipboard and types of data stored in the clipboard.

The CPU 12 is configured to perform various processes including controlling respective modules of the terminal device 4a through the internal bus 14 by operating in accordance with the programs (e.g., sets of instructions) and data stored in the memory 11. The processes performed by the CPU 12 include a process of accepting user input through input means of the terminal device 4a and presenting information to the user through output means of the terminal device 4a. Various functions of the terminal device 4a which will be described later are realized as a result of operation of the CPU 12 in accordance with the programs stored in the memory 11.

The digitizer 13 is an input device that is configured to include a pen-shaped pointing device (stylus) and a plate-shaped position detection device. The digitizer 13 has a function to detect a stylus position and a stylus type on the position detection device and is configured to output a path of the stylus indicated be the detection result, a stylus identification number, and so on to the CPU 12 through the internal bus 14 by way of an unshown I/O.

The terminal device 4b is a tablet type computer. On the other hand, the terminal device 4c is a smartphone. Although not described in detail, each of the terminal devices 4b and 4c has similar functions to that of the terminal device 4a, and each thereof makes up a terminal device in the data management system 1 according to the present embodiment. It should be noted that, in the data management system 1, various other computers can be used as terminal devices in addition to the terminal devices 4a to 4c. Although only the terminal device 4a will be descried as an example, the same holds true for other terminal devices including the terminal devices 4b and 4c.

The network 5 is a communication network that includes one or a plurality of various networks such as the Internet, intranet, extranet, telephone network, and mobile communication network.

The server 2 is a computer that makes up a server in a client-server model and configured to be able to communicate with the terminal device 4a that makes up a client in a client-server model through the network 5. The server 2 includes a processor and a memory storing instructions that, when executed by the processor, cause the server 2 to perform the server functions described herein.

The storage 3 is a storage device that includes a large capacity storage area, is configured to be able to communicate with the server 2, and is a device separate from the server 2. A storage area in a cloud storage service that is drawing attention in recent years can be cited as a specific example of the storage 3. Thus, one of the features of the present disclosure is that even if the external storage 3 different from the server 2 is used, both partial datasets and files can be used as well without any inconsistency, and will be described in detail later. It should be noted, however, that it is not absolutely necessary for the server 2 and the storage 3 to be separate devices in the present disclosure and that the storage 3 may be part of the server 2. Also, the server 2 may include a plurality of computers, and in this case, various functions of the server 2 which will be described later may be performed in a distributed manner among the plurality of computers.

The terminal device 4a according to the present embodiment is configured to be able to upload data temporarily stored in a clipboard to the storage 3. Also, the terminal device 4a according to the present embodiment is configured to be able to download data uploaded to the storage 3 by the terminal device 4a itself or other terminal device later. A detailed description will be given below of these functions.

Figure 2A:
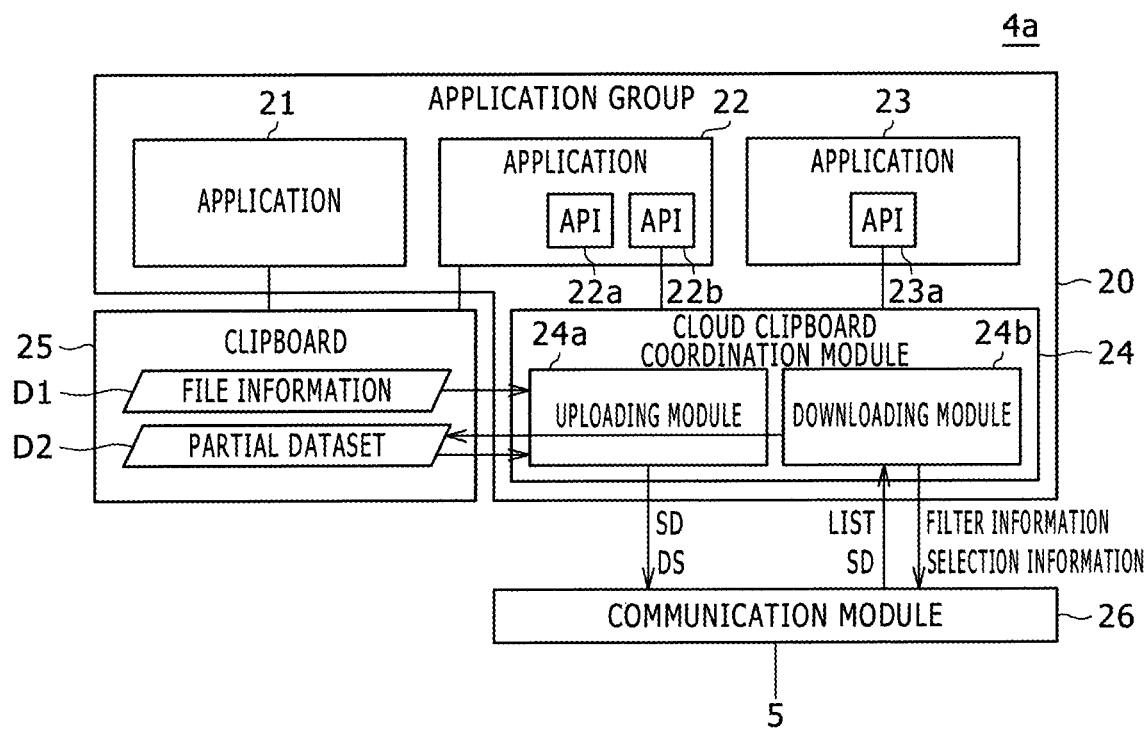
FIG. 2A is a schematic block diagram illustrating functional blocks of a terminal device 4a illustrated in FIG. 1.
Figure 2B:
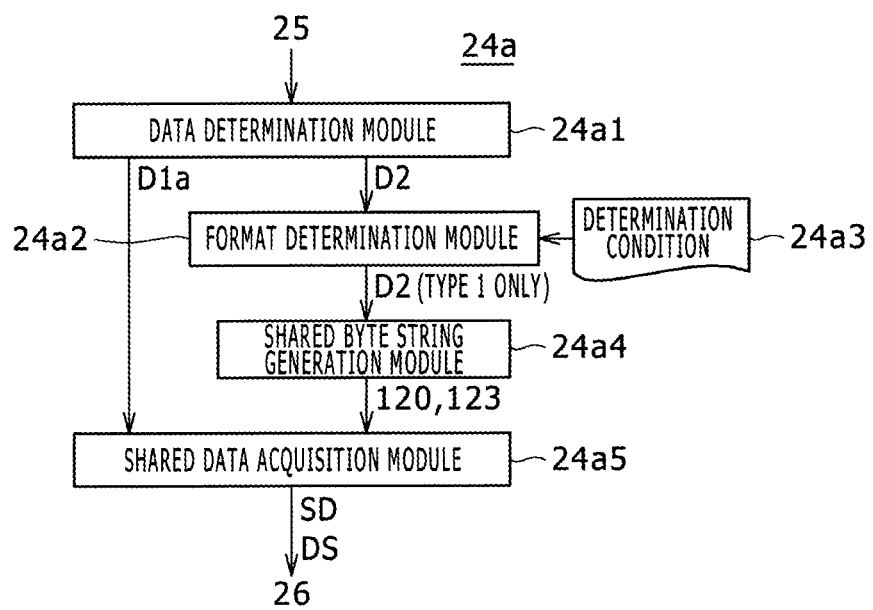
FIG. 2B is a schematic block diagram illustrating functional blocks of an uploading module 24a illustrated in FIG. 2A.

As illustrated in FIGS. 2A and 2B, the terminal device 4a is configured to functionally include an application group 20, a clipboard 25, and a communication module 26. The application group 20 includes applications 21 to 23, and a cloud clipboard coordination module 24. It should be noted that the cloud clipboard coordination module 24 is one of applications that run on the terminal device 4a as with the other applications 21 to 23.

The communication module 26 is a functional module realized as a result of controlling of the network interface card 10 by the CPU 12 illustrated in FIG. 1 in accordance with a communication program and is configured to communicate with each of the server 2 and the storage 3 via the network 5 using a given communication protocol. Also, the communication module 26 communicates with the cloud clipboard coordination module 24.

The clipboard 25 is an area in the memory 11 (refer to FIG. 1) configured to be able to temporarily store data exchanged between the applications as described above and is reserved in the memory 11 by the operation system. All data in the clipboard 25 is replaced with new data each time a write is performed. For example, when two applications are used at the same time, if one of the applications performs a write to the clipboard 25, all data written to the clipboard 25 by the other application is deleted and overwritten. Although it is possible for an application to have a stored content history of the clipboard 25 as a function, it is possible to hold only one time worth of data at least as a system. Also, because the clipboard 25 is a volatile area as described above, data in the clipboard 25 is deleted, for example, when the power for the terminal device 4a is turned off.

Data stored in the clipboard 25 includes two kinds of data, namely, file information D1 and partial datasets D2 as illustrated in FIG. 2A. The CPU 12 is configured to write one of these two kinds of data to the clipboard 25 in response to control performed by a file manager of the operating system and various applications.

Citing an example, if, in WINDOWS (registered trademark) Explorer that is a kind of file manager, the user selects one or a plurality of files and further presses Ctrl and C, the CPU 12 writes a pathname that is information indicating a storage location of the files in the memory 11 to the clipboard 25 as file information D1. Thus, the file information D1 is not files themselves but is information indicating the storage location of the files. Actual files normally exist in an external storage device rather than on a volatile memory.

Also, for example, if the user selects an arbitrary area on a drawing screen of Bamboo (registered trademark) Paper that is a kind of application by Wacom Co Ltd. and further presses a copy button, the CPU 12 writes, to the clipboard 25, various information related to image data drawn in that area as a partial dataset D2 that is a set of one or a plurality of data objects created in formats different from each other. Thus, the partial dataset D2 is data including one or a plurality of data objects held by the clipboard 25 at a given point in time. In other words, it can be said that the partial dataset D2 is data created by an application, that actual data exists in the clipboard 25, and that the partial dataset D2 is a set of partial data each of which can be an element making up a file.

Figure 3:
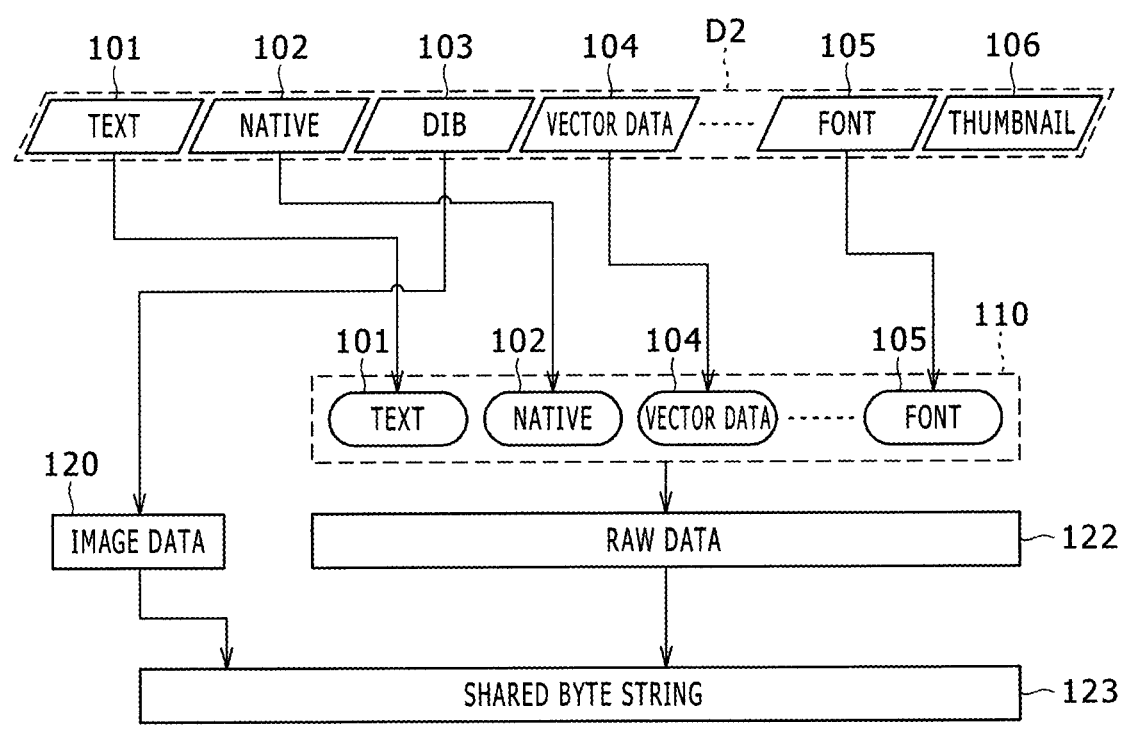
FIG. 3 is a diagram illustrating a relationship between a partial dataset D2 stored in a clipboard 25 illustrated in FIGS. 2A and 2B, a shared byte string 123, and image data 120.

Although the specific content of the above various pieces of information written as the partial dataset D2 varies depending on the application, the partial dataset D2 typically includes data objects 101 to 106 as illustrated in FIG. 3.

The data object 101 is data in a standard text format. For example, if an image and a character string exist in a mixed manner in an area selected by the user, the character string portion is extracted as the data object 101.

The data object 102 is data in a native format uniquely set by an application (native data). For example, in the case of presentation application data, the data object 102 is data having a data structure unique to that presentation application.

The data object 103 is data obtained by typically converting the same data as the data object 102 into a raster data type format that describes rectangular pixel data. JPEG, PNG, TIFF, GIF, and bitmap can be cited as examples of raster data type formats. In the example of FIG. 3, the data object 103 is bitmap data in a bitmap format (DIB: Device Independent Bitmap) that is, in particular, a common format independent of the application of all the raster data type formats. It should be noted that even in the case of text that includes only a character string in which copied data is described in a given font, the data object 103 may be generated by bitmapping the text generated in the given font.

The data object 104 is vector data in a format that can be arbitrarily set by an application. As examples of vector data, CAD (Computer Aided Design) data, SVG (Scalable Vector Graphics) data, electronic ink data described in Paten Document 4, and so on can be cited. The data object 104 according to the present embodiment is vector data that represents the shape of a target object selected by the user's selection operation and held in the clipboard 25 in an application.

The data object 105 is data that represents a font. The data object 106 is thumbnail image data obtained by downsizing the data object 103 that is rectangular data.

Here, in the present embodiment, the partial dataset D2 is used by classifying it into two types. The first is one that includes a data object created in a given format configured to be able to generate image data (type 1). The second is one that is other than the first (type 2). It is suitable to use the above DIB (data object 103), for example, as the given format.

For example, if the operating system is WINDOWS (registered trademark), the determination as to "whether or not the partial dataset D2 includes a data object created in a given format configured to be able to generate image data" can be made by a ContainsImage method of a Clipboard class. It should be noted that, in this case, in order to acquire one or each of a plurality of data objects stored in the clipboard 25, it is only necessary to use application programming interface (API) functions such as an EnumClipboardFormats method and a GetClipboardData method. This makes it possible to acquire each of the data objects while at the same time sorting each of the formats. Also, CF_DIB, JPEG file interchange format (JFIF), and so on can be cited as specific examples of a "given format configured to to generate image data" in addition to the above DIB. On the other hand, CF_LOCALE, CF_MAX, CF_TEXT, and so on can be cited as specific examples of a format not configured to be able to generate image data.

Also, if the operating system is Mac OS X (registered trademark), the above determination can be made by a types property and an availableTypeFromArray method of a NSPasteboard. Further, if the operating system is Android (registered trademark), the above determination can be made by a getUri method of an android.content.ClipboardManager.

Referring back to FIGS. 2A and to 2B, the application 21 uses the clipboard 25 but, on the other hand, does not have a function to coordinate with the cloud clipboard coordination module 24. Also, the application 22 is an application that uses the clipboard 25 and has a function to coordinate with the cloud clipboard coordination module 24. Coordination with the cloud clipboard coordination module 24 is achieved, for example, by linking dynamically or statically to given libraries relating to the functions provided by the cloud clipboard coordination module 24 (a compilation of a plurality of highly general-purpose programs) and at the same time using application programming interfaces (APIs) 22a and 22b. The application 23 is an application that, although not using the clipboard 25, uses the functions of the cloud clipboard coordination module 24 through an application programming interface 23c.

If, for example, the user performs a given copying operation, the applications 21 and 22 that use the clipboard 25 are configured to write data to be copied to the clipboard 25 in the format of the file information D1 or the format of the partial dataset D2 that includes a plurality of data objects created in formats different from each other. Also, the applications 21 and 22 are configured, for example, to read data (file information D1 or partial dataset D2) from the clipboard 25 if the user performs a given pasting operation.

On the other hand, the applications 22 and 23 that coordinate with the cloud clipboard coordination module 24 are configured to instruct the cloud clipboard coordination module 24 to acquire data (file information D1 or partial dataset D2) in the clipboard 25, for example, in response to a given operation performed by the user. The cloud clipboard coordination module 24 that received the instruction acquires the data in the clipboard 25, acquires shared data SD to be uploaded based on the acquired data, and sends the acquired shared data SD to the storage 3. Also, the applications 22 and 23 have a function to notify, to the cloud clipboard coordination module 24, a filtering condition when a list of the shared data SD accumulated in the storage 3 is shown, a function to present, to the user, the list supplied from the cloud clipboard coordination module 24 in response to the notice, and a function to cause the user to select the one or more of the plurality of pieces of shared data SD in the presented list and notify, to the cloud clipboard coordination module 24, selection information indicating a result thereof.

Here, the filtering condition is applicable at least to the shared data SD relating to the partial dataset D2. Also, it is preferable that the filtering condition should identify part or all of source information J5 illustrated in FIG. 5 which will be described later. This makes it possible to exclude the partial dataset D2 that cannot be used on the terminal device 4a due, for example, to a difference in an operating system J51 or an application J50 from the above list. Also, if a given stylus is specified as a filtering condition of a device J2, it is possible to easily acquire a list of drawing data created by using the stylus. As for the file information D1, one can comprehend the content of a file from the file type or filename as described above. Therefore, a filtering condition using the source information J5 as described above is applied at will.

Figure 4:
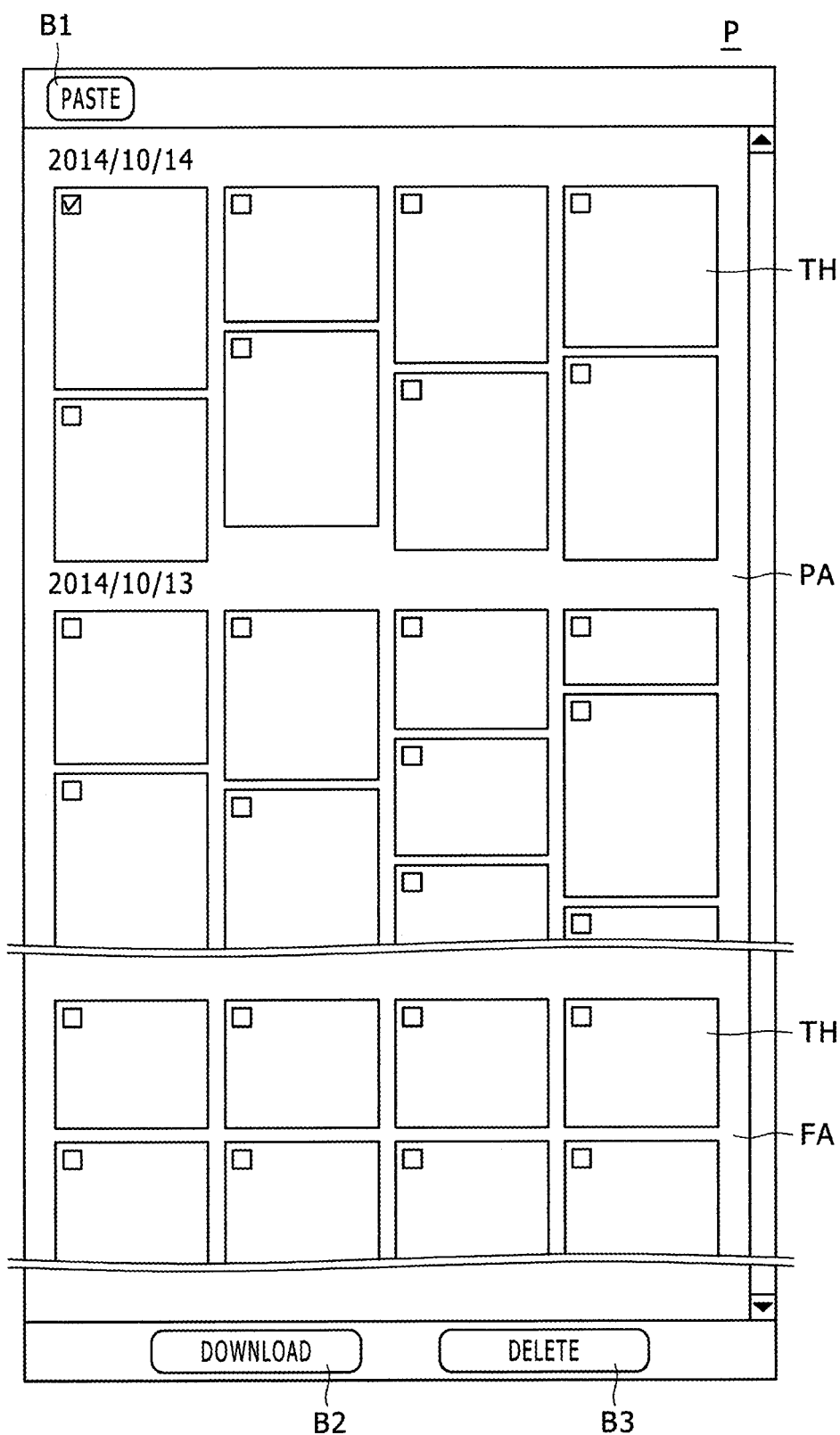
FIG. 4 is a diagram illustrating a page P that is an example of a list of shared data SD presented to a user.

Also, it is suitable that the list of the shared data SD presented to the user is, for example, in a format such as a page P illustrated in FIG. 4. The page P is shown by dedicated viewer software or general-purpose browser software. As illustrated in FIG. 4, the page P contains a display area PA of the shared data SD that is the partial dataset D2, a display area FA of the shared data SD that is a file, a paste button B1, a download button B2, and a delete button B3.

The display area PA shows a plurality of thumbnails TH. The thumbnails TH are small size images generated by the server 2 for each piece of the shared data SD based on image data sent from the terminal device 4a together with the shared data SD. The detailed nature of the thumbnails TH will be described later. Also, in the example of FIG. 4, the display area PA is shown for each date. This date is associated with a date/time created J46 in management information J1 which will be described later. As for the display area FA, if image data is sent together with the shared data SD, the thumbnails TH created based on the image data are shown. Also, the display area FA may be shown for each date.

A checkbox is arranged on each of the thumbnails TH as illustrated in FIG. 4. The operation of pressing the download button B2 with a check in the checkbox is a selection operation of the one or plurality of pieces of shared data SD by the user. Also, although not described in detail, pressing the delete button B3 with a check in the checkbox deletes the checked piece of shared data SD from the storage 3.

The paste button B1 is a button that is associated with the above given operation to instruct the cloud clipboard coordination module 24 to acquire data (file information D1 or partial dataset D2) in the clipboard 25. That is, when the user presses the paste button B1, the cloud clipboard coordination module 24 fetches data from the clipboard 25.

Referring back to FIGS. 2A and 2B, the cloud clipboard coordination module 24 is an application that has a function to input data from and output data to the applications 22 and 23, the clipboard 25, and the communication module 26. Actually, the cloud clipboard coordination module 24 is configured by, for example, WINDOWS (registered trademark) Dynamic Link Library (DLL), Static Library, or Service Program or a combination thereof.

As illustrated in FIG. 2A, the cloud clipboard coordination module 24 is configured to include an uploading module 24a and a downloading module 24b.

The uploading module 24a is a functional module that reads data (file information D1 or partial dataset D2) in the clipboard 25 in response to an instruction from the application 22 or 23, acquires the shared data SD to be uploaded by performing a given operation which will be described later, and sends (uploads) the acquired shared data SD to the storage 3 via the communication module 26.

On the other hand, the downloading module 24b is configured to have a function to send filter information representing a filtering condition notified from the application 22 or 23 to the server 2, receive a list (e.g., page P illustrated in FIG. 4) of the shared data SD returned from the server 2 as a result thereof, and transfer the list to the application 22 or the application 23. If the above selection information is notified from the application 22 or the application 23, the downloading module 24b is also configured to have a function to receive (download) the one or more of the plurality of shared data SD from the storage 3 in response to the selection information, load the shared data SD into the clipboard 25 if the shared data SD is the partial dataset D2 and store the shared data SD in one of a plurality of folders if the shared data SD is the file information D1.

A detailed description will be given below of the above given process performed by the uploading module 24a (process of acquiring the shared data SD from the file information D1 or the partial dataset D2).

In relation to the above given process, the uploading module 24a is configured to include, as functional modules, a data determination module 24a1, a format determination module 24a2, a shared byte string generation module 24a4, and a shared data acquisition module 24a5 as illustrated in FIG. 2B. Also, the uploading module 24a stores a determination condition 24a3.

The data determination module 24a1 is a functional module that determines whether the data acquired from the clipboard 25 is the file information D1 or the partial dataset D2. The data determination module 24a1 makes this determination by examining whether or not the format associated with the file information D1 is included in the data format list acquired from the clipboard 25. If the data determination module 24a1 determines that the data is the file information D1, actual data D1a of the file held at the storage position of that file is supplied to the shared data acquisition module 24a5. On the other hand, the data determined to be the partial dataset D2 by the data determination module 24a1 is supplied to the format determination module 24a2.

The format determination module 24a2 is a functional module that determines whether or not a data object created in a given format configured to generate image data is included in the data determined to be the partial dataset D2 by the data determination module 24a1. This determination is, in short, a determination as to whether the partial dataset D2 is the above type 1 or 2. Repeating what was described above, the type 1 is data that includes a data object created in a given format configured to to generate image data, and the type 2 is data other than the type 1. The determination condition 24a3 stores a determination criterion for sorting the types 1 and 2, and the format determination module 24a2 makes the above determination by referring to the determination condition 24a3.

If the format determination module 24a2 determines that the partial dataset D2 is the type 2, the uploading module 24a will not perform any more processes. In this case, therefore, no uploading is performed. On the other hand, if the format determination module 24a2 determines that the partial dataset D2 is the type 1, the partial dataset D2 is supplied to the shared byte string generation module 24a4.

The shared byte string generation module 24a4 is a functional module that generates image data 120 and a shared byte string 123 from the partial dataset D2. A detailed description will be given below of the functions of the shared byte string generation module 24a4 with reference to FIG. 3 again.

As described above, the partial dataset D2 is configured to include, for example, the data objects 101 to 106. The shared byte string generation module 24a4 generates the image data 120 based on the data object 103 that is a DIB format of all these data objects. This image data 120 will be used later when the server 2 creates the thumbnails TH (refer to FIG. 4). Therefore, it is acceptable as long as the image data 120 is data interpretable by the server 2. It is preferable that the image data 120 should be in a format such as raster data type format that guarantees that the image data 120 can be used on terminals with other operating systems. As mentioned before, a Bitmap format, a JPEG format, a PNG format, a TIFF, and a GIF can be cited as examples of raster data type formats. More suitably, it is preferable that the PNG format should be used that permits transparency to be set as data in addition to red, green, and blue (RGB) data. A detailed description will be given of advantages of permitting setting of transparency in the image data 120 in a third embodiment which will be described later.

The shared byte string generation module 24a4 extracts the data objects other than the data object 103 and the data object 106 that is a thumbnail, creates a clip dictionary 110, and generates a piece of raw data 122 to be sent by serializing each of the data objects in the clip dictionary 110. Then, the shared byte string generation module 24a4 generates the shared byte string 123 by coupling the image data 120 and the raw data 122.

The image data 120 and the shared byte string 123 generated as described above by the shared byte string generation module 24a4 are respectively supplied to the shared data acquisition module 24a5.

It should be noted that, as can be understood from the description given so far, the data object 106 that is a thumbnail is not supplied to the shared data acquisition module 24a5. As illustrated in FIG. 4, although the thumbnail TH of each piece of the shared data SD is included in the list of shared data SD supplied to the terminal device 4a from the server 2, a thumbnail uniquely created by the server 2 on the basis of the image data 120 is used as this thumbnail TH rather than the data object 106. The same is true when a file is to be uploaded. The reason for performing such a process is to ensure that a list is shown (showing of the page P illustrated in FIG. 4) properly on the terminal device 4a even if the thumbnail that is the data object 106 was created in a format unique to the application.

The shared data acquisition module 24a5 is configured to have a function to acquire the actual data D1a of the file supplied from the data determination module 24a1 or the shared data SD to be uploaded (including the image data 120 and the management information J1) based on the image data 120 and the shared byte string 123 supplied from the shared byte string generation module 24a4 and acquire a data size DS (size information) of the acquired shared data SD.

The shared data acquisition module 24a5 does not send the shared data SD first, but sends the data size DS to the server 2. Then, if, as a result thereof, an address (URL: Uniform Resource Locator) that indicates a storage location of the shared data SD in the storage 3 is returned from the server 2, the shared data acquisition module 24a5 sends, to the address, the shared data SD and the source information J5 that makes up part of the management information J1 which will be described later. Thus, the uploading of the shared data SD is complete.

A detailed description will be given below of the specific content of the shared data SD.

First, if the image data 120 and the shared byte string 123 are supplied from the shared byte string generation module 24a4 to the shared data acquisition module 24a5, that is, if the shared data SD is the partial dataset D2 to be uploaded, the shared data SD is configured to include the image data 120 and the shared byte string 123 supplied from the shared byte string generation module 24a4 to the shared data acquisition module 24a5.

On the other hand, if the actual data D1a of a file is supplied from the shared byte string generation module 24a4 to the shared data acquisition module 24a5, that is, if the shared data SD is the file to be uploaded, the shared data SD is configured to include the actual data D1a of the file indicated by the file information D1. It should be noted that the shared data SD in this case may also have to include image data as when the partial dataset D2 is to be uploaded. If the presence of image data is essential when a file is to be uploaded, it is preferable that the image data should be image data relating to the file to be uploaded. An icon representing an application that created a file (one stored in the system folder of the operation system) and image data given by an application (e.g., photo data of a compact disc (CD) jacket given when the file is a music file in mp3 format), for example, can be cited as specific examples of such image data.

Figure 5:
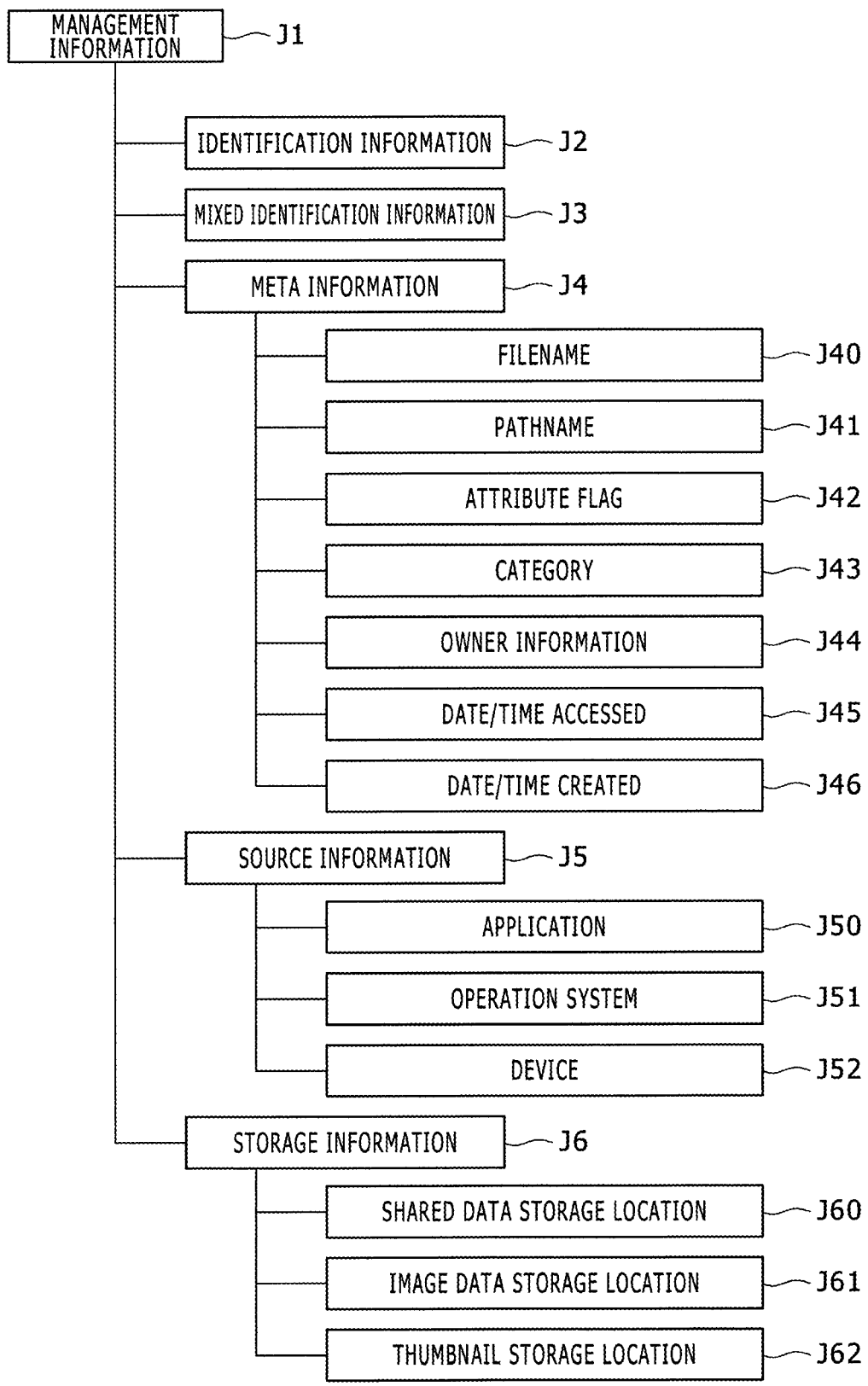
FIG. 5 is a diagram illustrating a configuration of management information J1 added to the shared data SD.

Also, the shared data SD includes the management information J1 illustrated in FIG. 5 irrespective of the type of data to be uploaded. The management information J1 is information generated by the shared data acquisition module 24a5 and is configured to include identification information J2, mixed identification information J3, meta information J4, the source information J5, and storage information J6 as illustrated in FIG. 5.

The identification information J2 is identification (ID) information used to uniquely identify the shared data SD in the storage 3 and is set by the server 2 after the completion of uploading. Therefore, the identification information J2 is blank when the shared data acquisition module 24a5 acquires the management information J1.

The mixed identification information J3 is information that indicates whether the shared data SD is a file represented by the file information D1 or the partial dataset D2. If the file is to be uploaded, the shared data acquisition module 24a5 sets, in the mixed identification information J3, information indicating that the shared data SD is a file. If the partial dataset D2 is to be uploaded, the shared data acquisition module 24a5 sets, in the mixed identification information J3, information indicating that the shared data SD is the partial dataset D2.

The meta information J4 is a set of various pieces of information relating to an attribute of the shared data SD and is configured to include a filename J40, a pathname J41, an attribute flag J42, a category J43, owner information J44, a date/time accessed J45, and a date/time created J46 as illustrated in FIG. 5. If the file is to be uploaded, the shared data acquisition module 24a5 sets each of the filename J40, the pathname J41, the attribute flag J42, the category J43, the owner information J44, and the date/time created J46 based on detailed information of the file. On the other hand, if the partial dataset D2 is to be uploaded, the shared data acquisition module 24a5 sets the current date and time in the date/time created J46, and on the other hand, leaves the filename J40, the pathname J41, the attribute flag J42, the category J43, and the owner information J44 blank. Because the date/time accessed J45 is information that is set by the server 2, the date/time accessed J45 is blank at that time when the shared data acquisition module 24a5 generates the management information J1.

The source information J5 is a set of various pieces of information relating to the environment in which the shared data SD was generated, and more specifically, is configured to include the application J50, the operation system J51, and the device J52 as illustrated in FIG. 5. Of these, the shared data acquisition module 24a5 sets information indicating the operation system of the terminal device 4a for the operation system J51 and sets identification information of the stylus used to draw image data for the device J52. For the application J50, on the other hand, if the file is to be uploaded, information indicating the application that created the file is set, and if the partial dataset D2 is to be uploaded, information indicating the application that wrote the partial dataset D2 to the clipboard 25 is set. It should be noted that if data stored in the clipboard 25 includes owner information indicating the application that owns that data, it is suitable that the shared data acquisition module 24a5 acquires information indicating the application from this owner information. In addition, information indicating hardware of the terminal device 4a may also be included in the source information J5.

The storage information J6 is a set of information relating to addresses in the storage 3, and more specifically, is configured to include a shared data storage location J60 indicating the address of the storage location of the shared data SD, an image data storage location J61 indicating the address of the storage location of image data for creating the thumbnail TH, a thumbnail storage location J62 indicating the address of the storage location of the thumbnail TH as illustrated in FIG. 5. The storage information J6 is information set by the storage 3 and is blank at that time when the shared data acquisition module 24a5 generates the management information J1.

Figure 6:
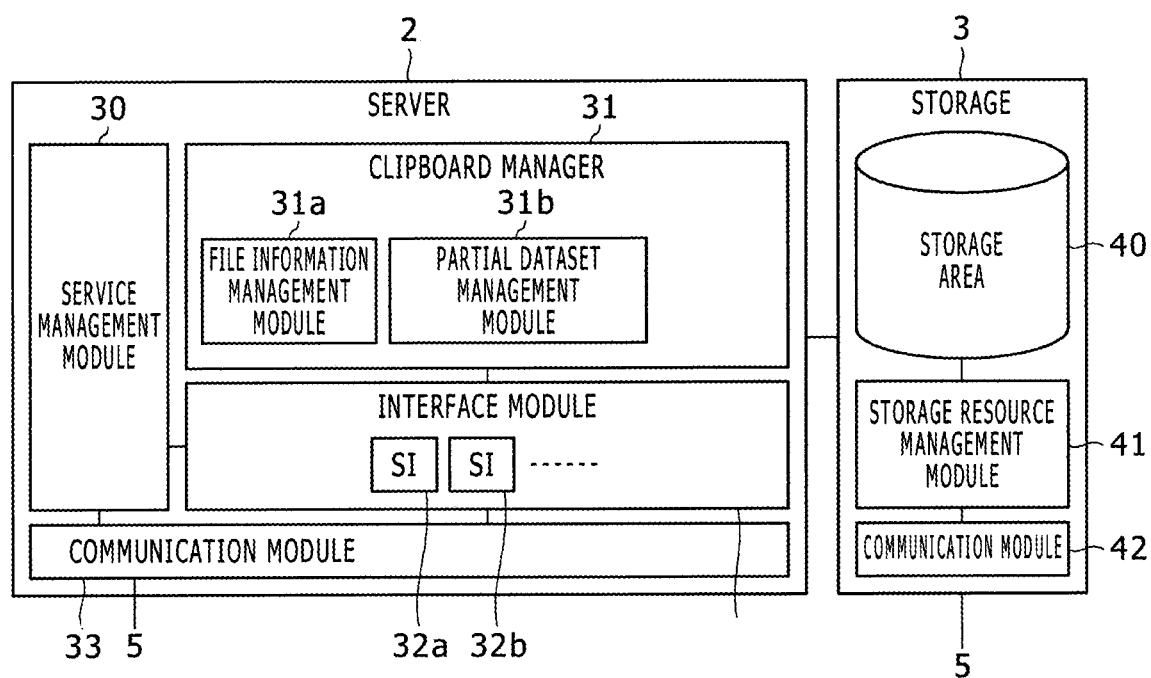
FIG. 6 is a schematic block diagram illustrating functional blocks of a server 2 and a storage 3 illustrated in FIG. 1.

A description will be given next of details of the configurations of the server 2 and the storage 3 with reference to FIG. 6. As illustrated in the figure, the server 2 is configured to include a service management module 30, a clipboard manager 31, an interface module 32, and a communication module 33, and the storage 3 is configured to include a storage area 40, a storage resource management module 41, and a communication module 42.

Each of the communication modules 33 and 42 is configured to have a function to communicate with the terminal device 4a via the network 5 using a given communication protocol. Also, the communication module 33 has a function to communicate with each of the service management module 30 and the interface module 32, and the communication module 42 has a function to communicate with the storage resource management module 41.

The service management module 30 is a functional module that authenticates users. In the present embodiment, various pieces of data are sent and received between the interface module 32 and the terminal device 4a. The terminal device 4a is configured to send given ID information before this transmission and reception. The service management module 30 stores, in advance, a plurality of pieces of ID information and determines whether or not received ID information is present among the stored information. Then, only if the service management module 30 determines that the received ID information is present, the service management module 30 permits communication with the terminal device 4a that sent that ID information to the interface module 32. It should be noted that, specifically, text data input by the user from a keyboard, identification information (stylus ID) written in advance in the above stylus such as manufacturer's serial number of the terminal device 4a, and so on may be used as ID information. Also, a password may be used in addition to ID information.

The interface module 32 is a functional module that relays various kinds of data sent and received between the terminal device 4a, the service management module 30, and the clipboard manager 31. The interface module 32 is configured to include service interfaces 32a and 32b.

The service interface 32a has a function to acquire, in response to a request from the terminal device 4a to download the shared data SD, the address indicating the storage location of the requested shared data SD from the storage 3 and return the address to the terminal device 4a. The downloading module 24b (refer to FIGS. 2A and 2B) of the terminal device 4a downloads the shared data SD directly from the storage 3 by accessing the address thus acquired. The service interface 32a also has a function to notify the clipboard manager 31 of access to the storage 3 if an address is acquired as described above.

The service interface 32b has a function to receive filter information sent from the terminal device 4a and transfer the filter information to the clipboard manager 31. The page P (refer to FIG. 4) showing the list of shared data SD is output from the clipboard manager 31 that received the filter information. Therefore, the service interface 32b returns this page P to the terminal device 4a.

Next, the clipboard manager 31 is a functional module that manages the shared data SD stored in the storage 3 based on the management information J1 and is configured to have a file information management module 31a and a partial dataset management module 31b.

The file information management module 31a is a functional module that performs various processes concerning management of the shared data SD relating to the file. Also, the partial dataset management module 31b is a functional module that performs various processes concerning management of the shared data SD relating to the partial dataset D2.

The file information management module 31a and the partial dataset management module 31b perform, as common functions, a process of inquiring the storage 3, if the data size DS is received from the terminal device 4a, whether or not the shared data SD of that data size DS can be stored, a process of transferring a reply to this inquiry from the storage 3 to the terminal device 4a, a process of creating the thumbnail TH (refer to FIG. 4), if image data is included in the shared data SD, based on the image data (image data 120 illustrated in FIG. 3 for the partial dataset D2 and image data related to a file for the file), a process of setting a unique ID for the identification information J2 in the shared data SD (ID for uniquely identifying the shared data SD in the storage 3), a process of generating the page P illustrated in FIG. 4 based on the list of shared data SD output from the storage 3, a process of updating the data/time accessed J45 (refer to FIG. 5) stored in the storage 3 for the matching shared data SD to information indicating the date/time at that point in time if a notice to the effect that the storage 3 was accessed is received from the service interface 32a, and other processes. It should be noted that because the shared data SD relating to the partial dataset D2 always includes the image data 120 as described above, the partial dataset management module 31b creates the thumbnail TH for all the pieces of shared data SD.

On the other hand, the partial dataset management module 31b performs, as an intrinsic process, a process of generating a filter based on filter information supplied from the service interface 32b and supplying the filter to the storage 3. In this case, only the shared data SD that satisfies this filter is included in the list output from the storage 3.

The storage area 40 of the storage 3 is, for example, a storage area that includes a hard disk and is used to store the shared data SD.

The storage resource management module 41 is a functional module that serves a role to manage the free space of the storage area 40 of the storage 3. More specifically, when inquired from the shared data management module 31a as to whether the shared data SD of the data size DS can be stored, the storage resource management module 41 determines whether or not the shared data SD can be stored by checking the free space size of the storage area 40. Then, if the storage resource management module 41 determines that the shared data SD can be stored, the storage resource management module 41 acquires the address in the storage area 40 where the shared data SD is to be stored and returns the address to the file information management module 31a. On the other hand, if the storage resource management module 41 determines that the shared data SD cannot be stored, the storage resource management module 41 returns a reply to that effect to the shared data management module 31a.

Also, the storage resource management module 41 performs a process of writing the shared data SD sent from the terminal device 4a with a specified address in the storage area 40 to that address, giving a temporary ID to identify the shared data SD, and returning the temporary ID to the terminal device 4a, a process of extracting, if the above filter is sent from the shared data management module 31a, the shared data SD from the storage area 40 based on that filter, and returning a list showing the result thereof, a process of returning, if the above unique ID is sent from the shared data management module 31a, the address indicating the storage location of the shared data SD that matches with the unique ID in the storage area 40, a process of reading, if the terminal device 4a makes a request to download the shared data SD that specifies this address, the shared data SD from the storage area 40 based on the address and returning the shared data SD to the terminal device 4a.

The configurations of the data management system 1 according to the present embodiment have been described above. Next, the processes performed by each configuration described above will be described more in detail again from the viewpoint of a processing sequence and a processing flow with reference to FIGS. 7 to 10. It should be noted that although an example will be described below in which the application 22 is used as an application in the terminal device 4a, other application may be used for some or all of the processes.

Figure 7:
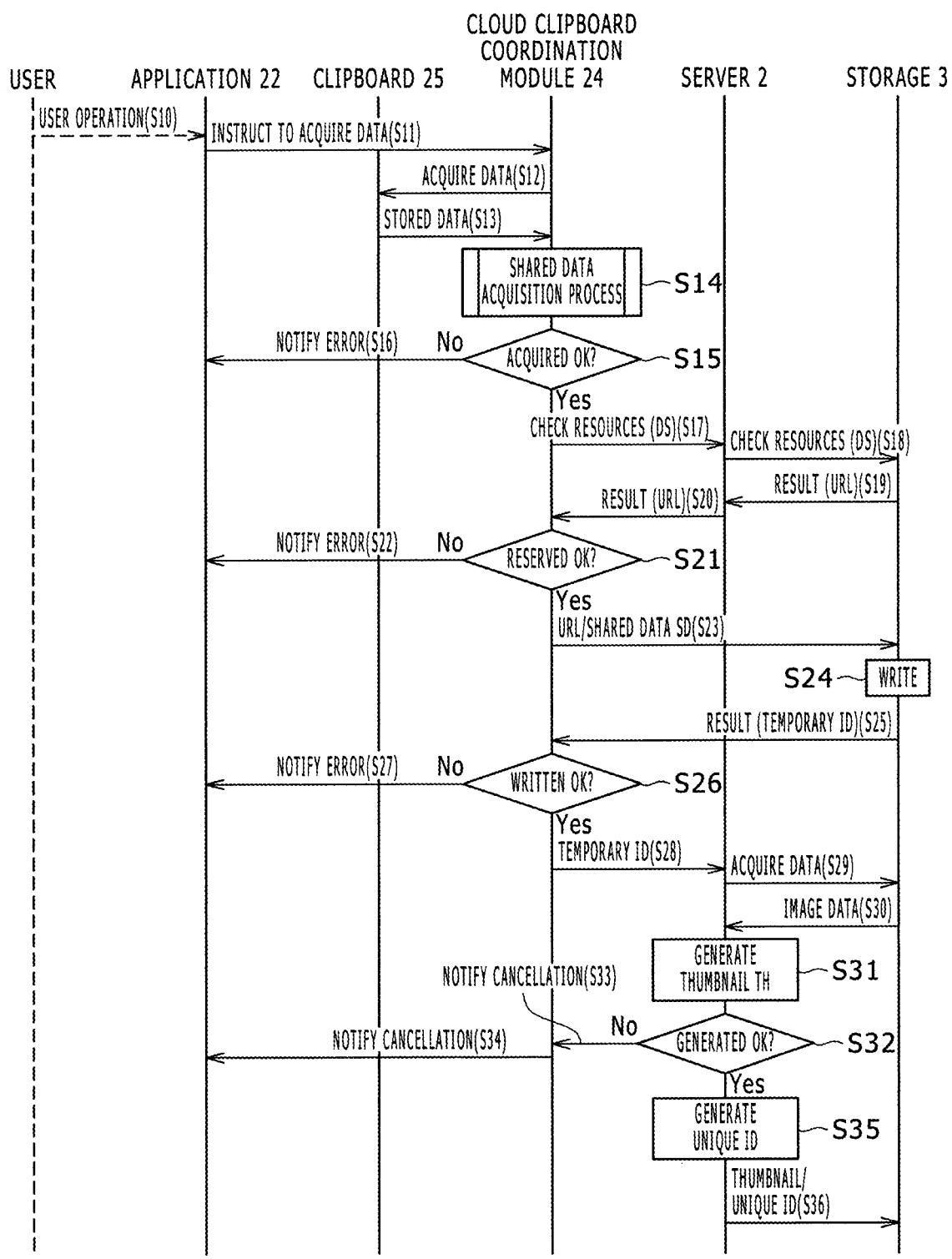
FIG. 7 is a diagram illustrating a processing sequence for uploading the shared data SD from the terminal device 4a to the storage 3.

A description will be given first with focus on uploading of the shared data SD. As illustrated in FIG. 7, starting of an uploading process is triggered by a user operation (S10). This user operation is, for example, an operation of pressing the paste button B1 described with reference to FIG. 4.

It should be noted that an operation of updating data in the clipboard 25 (copying operation such as pressing Ctrl and C) may be treated as the above user operation rather than the operation of pressing the paste button B1. However, if the uploading process is triggered by this operation, the uploading process is likely to be performed an excessive number of times. Therefore, it is preferable that the operation of updating data in the clipboard 25 and the operation that triggers uploading should be separate from each other as described above.

The application 22 that receives the user operation instructs the cloud clipboard coordination module 24 to acquire data (file information D1 or partial dataset D2) in the clipboard 25 (S11). The cloud clipboard coordination module 24 that received this instruction acquires data stored in the clipboard 25 (S12 and S13) and performs the shared data acquisition process S14 illustrated in FIG. 8.

Figure 8:
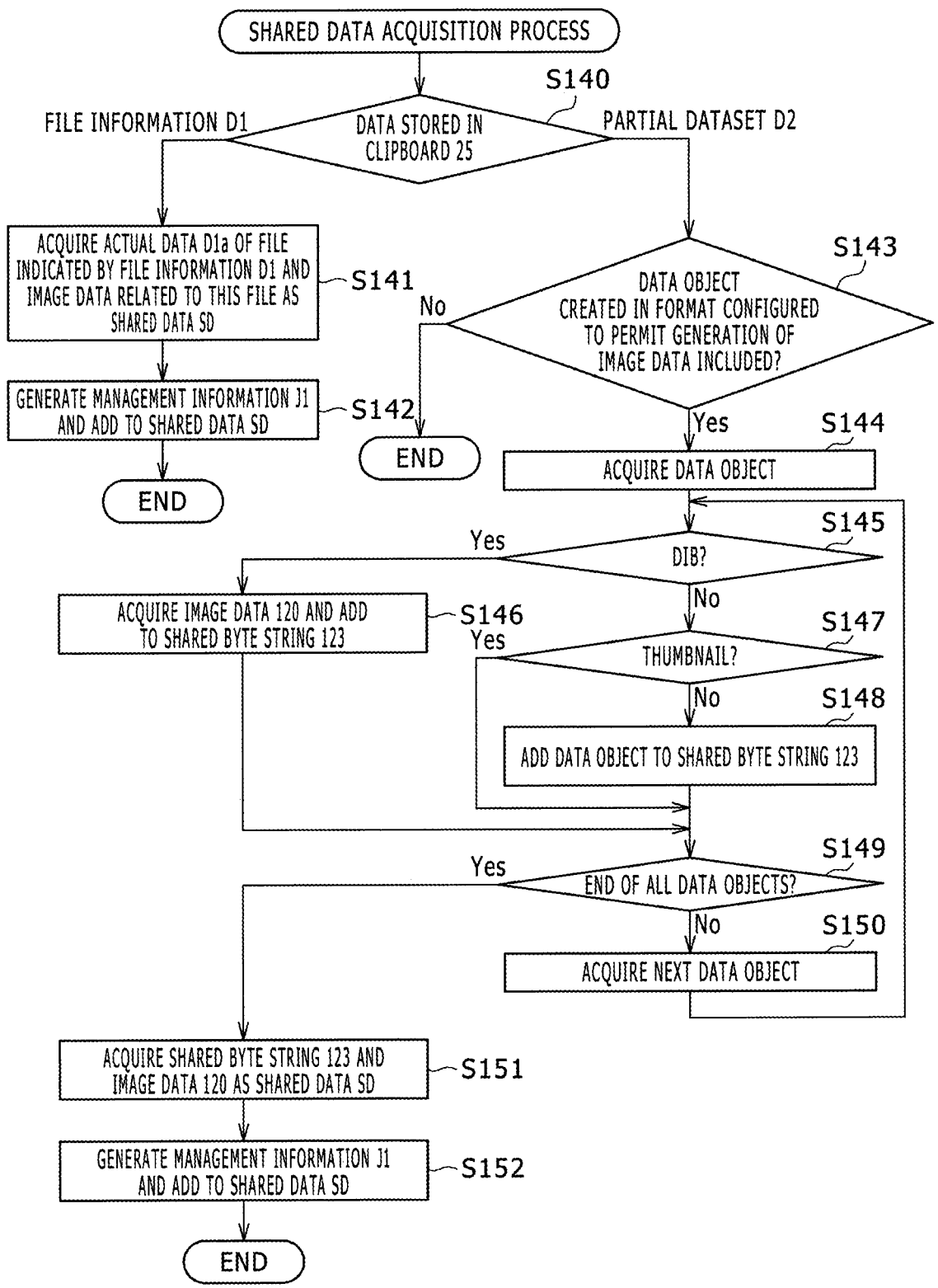
FIG. 8 is a processing flowchart illustrating details of a shared data acquisition process illustrated in FIG. 7.

In the shared data acquisition process S14, as illustrated in FIG. 8, it is determined first whether the data stored in the clipboard 25 is the file information D1 or the partial dataset D2 (S140). As a result, if the data is the file information D1, the cloud clipboard coordination module 24 acquires, as the shared data SD, the actual data D1a of the file indicated by the file information D1 and image data related to this file (S141). Then, further, the cloud clipboard coordination module 24 generates the management information J1 concerning the file indicated by the file information D1 and adds the management information J1 to the shared data SD (S142).

On the other hand, if the data stored in the clipboard 25 is the partial dataset D2, the cloud clipboard coordination module 24 determines whether or not a data object created in a format configured to generate image data is included in that data (S143). As described above, the data object 103 that is in a DIB format illustrated in FIG. 3 can be cited as an example of a "data object created in a format configured to generate image data." If a determination result to the effect that a data object created in a format configured to generate image data is not included is acquired, the process is terminated without acquiring the shared data SD. On the other hand, if a determination result to the effect that a data object created in a format configured to be able to generate image data is included is acquired, the processes from S144 onward are performed.

At S144, the cloud clipboard coordination module 24 acquires the first data object (e.g., data object 101 in FIG. 3) first. Then, the cloud clipboard coordination module 24 determines whether this data object is in a DIB format (data object 103 in FIG. 3) (S145), and further determines whether this data object is a thumbnail (data object 105 in FIG. 3) (S147). If the cloud clipboard coordination module 24 determines at S145 that the data object is a DIB, the cloud clipboard coordination module 24 acquires the image data 120 illustrated in FIG. 3 based on that data object and further adds the image data 120 to the shared byte string 123 (S146). If the cloud clipboard coordination module 24 determines at S145 that the data object is not a thumbnail, the cloud clipboard coordination module 24 adds that data object to the shared byte string 123 (S148). If the cloud clipboard coordination module 24 determines at S147 that the data object is a thumbnail, the cloud clipboard coordination module 24 does not update the shared byte string 123.

After performing the above processes, the cloud clipboard coordination module 24 determines whether or not the processes are complete for all the data objects in the partial dataset D2 (S149). If the cloud clipboard coordination module 24 determines at S149 that the processes are not yet complete for all the data objects in the partial dataset D2, the cloud clipboard coordination module 24 acquires the next data object (S150) and repeats the processes from S145 onward. On the other hand, if the cloud clipboard coordination module 24 determines at S149 that the processes are complete for all the data objects in the partial dataset D2, the cloud clipboard coordination module 24 acquires the shared byte string 123 and the image data 120 obtained in the processes up to this point as the shared data SD (S151), further generates the management information J1 for this shared data SD, and adds the management information J1 to the shared data SD (S152). This concludes the shared data acquisition process S14.

Referring back to FIG. 7, the cloud clipboard coordination module 24 determines whether or not the shared data SD was acquired (S15), and if the cloud clipboard coordination module 24 determines that the shared data SD was not acquired, the cloud clipboard coordination module 24 notifies an error to the application 22 (S16). On the other hand, if the cloud clipboard coordination module 24 determines that the shared data SD was acquired, the cloud clipboard coordination module 24 acquires the data size DS of the shared data SD and sends, to the server 2, a resource check request that includes the acquired data size DS (S17). The server 2 transfers the resource check request to the storage 3 (S18). When the storage 3 receives the resource check request, the storage 3 checks whether or not there is a free space that can accommodate the data size DS in the storage area 40 (FIG. 6), and if there is a free space, the storage 3 returns, to the server 2, a check result including an address (URL) indicating the storage location of the shared data SD (S19). The server 2 transfers this check result to the terminal device 4a (S20).

The cloud clipboard coordination module 24 determines whether or not a storage location (resource) of the shared data SD has been successfully reserved (S21) by determining whether or not the check result including the address indicating the storage location of the shared data SD was returned. If the cloud clipboard coordination module 24 determines that a storage location has not been successfully reserved, the cloud clipboard coordination module 24 notifies an error to the application 22 (S22).

On the other hand, if the cloud clipboard coordination module 24 determines that a storage location has been successfully reserved, the cloud clipboard coordination module 24 sends the shared data SD with the address included in the check result as a destination (S23). The storage 3 that received the shared data SD to the storage area 40 (S24) and returns a write result including the above temporary ID to the terminal device 4a (S25).

It should be noted that, at S23, the cloud clipboard coordination module 24 should preferably send each piece of image data (image data 120 illustrated in FIG. 3 for the partial dataset D2 and image data related to a file for the file) and the management information J1 included in the shared data SD first, and next, send other data in the shared data SD (actual data D1a of the file or the shared byte string 123). In other words, the cloud clipboard coordination module 24 should preferably send image data and the management information J1 included in the shared data SD and other data to different storage positions (addresses) in the storage 3. Then, the storage 3 should preferably store the image data, the management information J1, and other data thus received separately in the storage area 40 (store these pieces of data in different storage positions). This allows for a general-purpose storage to be used as the storage 3.

In detail, at S30 which will be described later, it is necessary to extract only image data in the shared data SD from the storage 3 into the server 2. At this time, it is preferable that data to be sent from the storage 3 to the server 2 should be only image data (rather than the entire shared data SD) from the viewpoint of efficient use of communication capacity. However, if the entire shared data SD including image data is stored in the storage area 40 as a single piece of data, a processing mechanism is required in the storage 3 to extract image data from the shared data SD in order to ensure that only image data is sent from the storage 3 to the server 2. It is usually difficult to provide such a mechanism in a general-purpose storage, which means that a general-purpose storage cannot be used. In contrast, if the shared data SD is stored as described above, image data and other data are stored separately in the storage area 40. As a result, it is possible to send only image data from the storage 3 to the server 2 at S30 without providing the above processing mechanism in the storage 3. Therefore, a general-purpose storage can be used as the storage 3.

Also, from S54 to S56 (FIG. 9) which will be described later, it is necessary to extract the list of shared data SD that agrees with the filter generated at S54 from the storage 3 into the server 2, and at this time, it is necessary to determine whether or not each piece of the shared data SD agrees with the filter in either the server 2 or the storage 3. If a general-purpose storage is used as the storage 3, it is difficult to provide this determination process in the storage 3. As a result, it is necessary that the determination is made in the server 2. However, if the entire shared data SD including the management information J1 is stored in the storage area 40 as a single piece of data, the server 2 must read all the shared data SD once from the storage 3 to make the determination. This is not preferred from the viewpoint of efficient use of the communication capacity. In contrast, if the shared data SD is stored as described above, the management information J1 and other data are stored separately in the storage area 40. As a result, it is only necessary for the server 2 to extract only the management information J1 first to make the above determination and then read the data relating to the shared data SD that agrees with the filter (more specifically, the identification information J2 in the management information J1 and the thumbnail TH). Therefore, it is possible to use the communication capacity efficiently, and this also constitutes another factor for enabling use of a general-purpose storage as the storage 3.

It should be noted that if the cloud clipboard coordination module 24 sends image data and the management information J1 included in the shared data SD and other data to different storage positions (addresses) in the storage 3, the storage position of the image data is the storage position accessed by the server 2 at S29 which will be described later to generate the thumbnail TH showing the content such as the shared byte string 123, and the storage position of other data is the storage position accessed by the terminal device 4*a* at S70 which will be described later to download the shared data SD whose content is shown by the thumbnail TH.

The cloud clipboard coordination module 24 determines whether or not the write is complete by determining whether or not the write result including the temporary ID was returned (S26). If the cloud clipboard coordination module 24 determines that the write is not complete, the cloud clipboard coordination module 24 notifies an error to the application 22 (S27). On the other hand, if the cloud clipboard coordination module 24 determines that the write is complete, the cloud clipboard coordination module 24 sends the received temporary ID (information indicating that the shared data SD has been stored in the storage 3) to the server 2 (S28). The server 2 that received the temporary ID acquires the matching image data from the storage 3 using the temporary ID (S29 and S30) and generates the thumbnail TH illustrated in FIG. 4 based on the acquired image data (S31). Then, the server 2 determines whether or not the generation is successful (S32), and if the server 2 determines that the generation is not successful, the server 2 cancels the write of the shared data to the storage 3 and notifies information to that effect to the terminal device 4*a* (S33). The cloud clipboard coordination module 24 that received the notice notifies the cancellation to the application 22 (S34). On the other hand, if the server 2 determines that the generation is successful at S32, the server 2 generates the above unique ID (S35). Then, the server 2 stores, in the storage 3, the thumbnail TH generated at S31 in association with the matching shared data SD and sets the unique ID generated at S35 in the identification information J2 in the management information J1 (S36). This concludes a series of processes related to uploading of the shared data SD.

Figure 9:
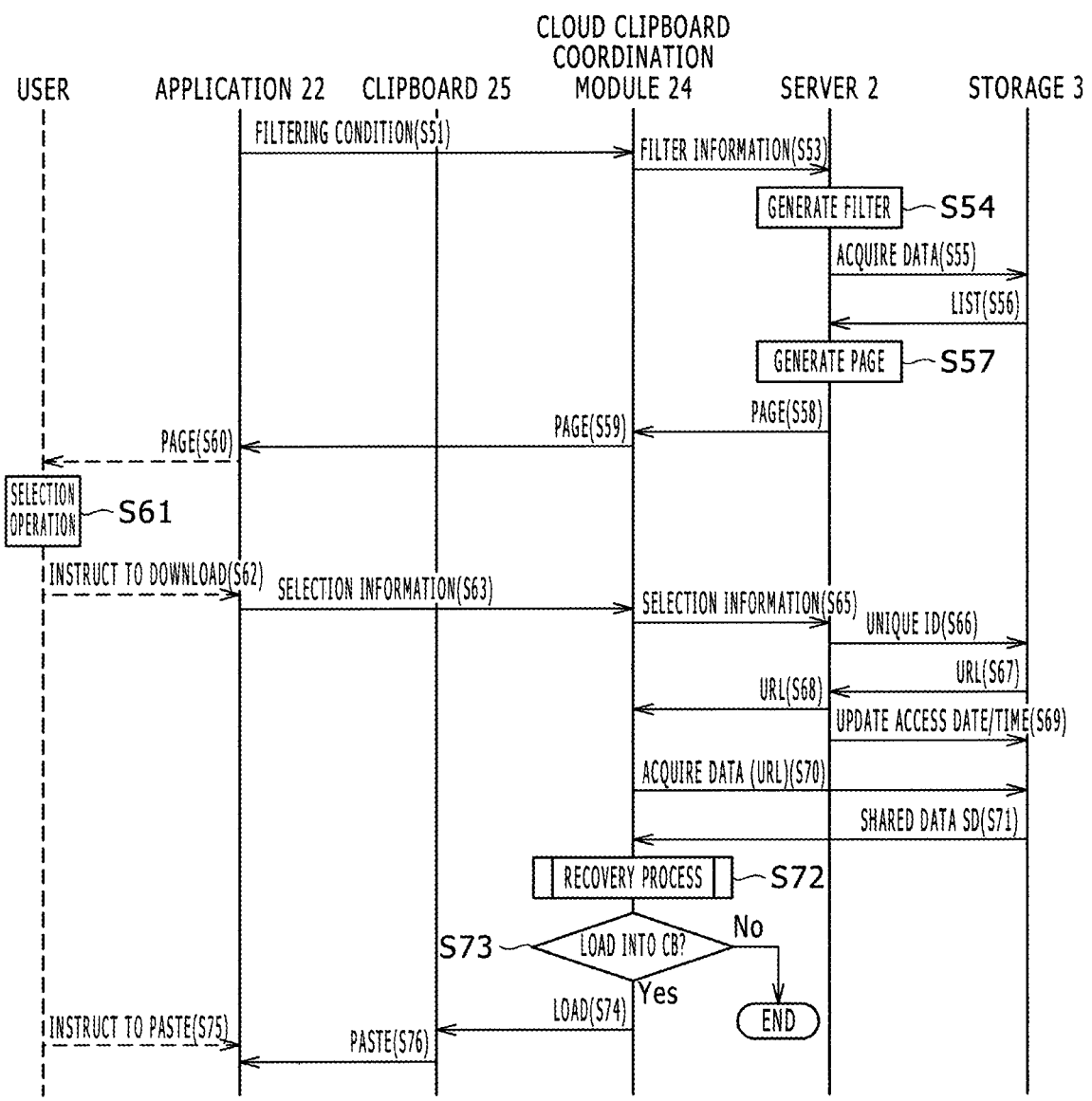
FIG. 9 is a diagram illustrating a processing sequence for presenting the page P illustrated in FIG. 4 on the terminal device 4 to the user and downloading the shared data SD from the storage 3 to the terminal device 4 in response to user selection on the page P.

A description will be given next with focus on downloading of the shared data SD. As illustrated in FIG. 9, ahead of downloading, a filtering condition is supplied from the application 22 to the cloud clipboard coordination module 24 to filter the shared data SD (S51). The filtering condition is applied at least to the shared data SD relating to the partial dataset D2 as described above and identifies part or whole of the source information J5 illustrated in FIG. 5. The cloud clipboard coordination module 24 generates filter information representing the supplied filtering condition and sends the filter information to the server 2 (S53).

The server generates a filter based on the received filter information (S54) and acquires, from the storage 3, the list of shared data SD that agrees with the generated filter (S55 and S56). In this case, it is the server 2 that determines whether or not each piece of the shared data SD agrees with the filter as described above. Also, because the filtering condition is applied only to the plurality of shared data SD relating to the partial dataset D2, the server 2 configures the above list by selecting the one or plurality of pieces of shared data SD that are the partial datasets D2 that satisfy the filtering condition and the one or plurality of pieces of shared data SD that are the files from among the plurality of pieces of shared data SD stored in the storage 3. It should be noted that the above list includes at least the thumbnail TH generated by the server 2 at S31 in FIG. 7 and the unique ID set in the identification information J2 illustrated in FIG. 4 for each piece of the shared data SD. The server 2 generates the page P illustrated in FIG. 4 (S57) based on the list thus acquired and supplies the page P to the terminal device 4*a* (S58 and S59).

It should be noted that although FIG. 9 illustrates a case in which the generation of a filter at S54 to the generation of the page P at S57 are performed successively, the filter generated at S54 may be, for example, stored in the server 2, and if a request is made from the terminal device 4*a* separately, the page P may be presented to the terminal device 4*a* by performing the processes from S55 onward. In this case, it is possible to perform the processes from S55 onward even in a considerable number of days (e.g., 10 days) after the processes up to S54.

A description will be given here of an example of a filter. A filtering condition in this example is configured to have a condition related to the operation system such as "WINDOWS (registered trademark)." In this case, as for the partial datasets D2, only the partial datasets D2 that were created on the terminal devices installed with "WINDOWS (registered trademark)" are included in the list. As for the files, on the other hand, the files created on the terminal devices installed with an operation system other than "WINDOWS (registered trademark)" are also included in the list. As for the partial datasets D2, there is almost no possibility that the partial datasets D2 created on the terminal devices installed with a different operation system can be used. In contrast, as for the files, it is often possible that the files can be used despite the difference in operation system. From the viewpoint of user convenience, therefore, handling as described above is suitable.

The application 22 receives the page P via the cloud clipboard coordination module 24 and presents the page P to the user (S60). When the user performs an operation of selecting the shared data SD on the presented page P (S61; operation of checking a checkbox in the example of FIG. 4) and further instructs the downloading (S62; operation of pressing the download button B2 with a check in one or more checkboxes in the example of FIG. 4), the application 22 supplies, to the cloud clipboard coordination module 24, selection information indicating the one or plurality of selected pieces of shared data SD (S63). The cloud clipboard coordination module 24 transfers the supplied selection information to the server 2 (S65). It should be noted that selection information is suitably configured by each of the unique IDs of the one or plurality of selected pieces of shared data SD.

Here, it is necessary to design the page P in advance such that only one piece of data can be selected from among the shared data SD that are the partial datasets D2. The reason for this is that the only one partial dataset D2 can be loaded into the clipboard 25 at a time. Also, in order to prevent confusion of the user, it is suitable to design the page P such that one can select only either the shared data SD that is the partial dataset D2 or the shared data SD that is a file at the same time. A description will be given below on the premise that the page P is designed in such a manner.

The server 2 that received the selection information acquires, based on the one or plurality of unique IDs matching with the one or plurality of selected pieces of shared data SD, an address (URL) indicating the storage location of these pieces of shared data SD from the storage 3 (S67) and transfers the address to the terminal device 4a (S68). This address is the address set in the shared data storage location J60 of the management information J1 illustrated in FIG. 5. The server 2 also updates the date/time accessed J45 of the management information J1 illustrated in FIG. 5 to the current date and time in relation to the one or plurality of matching pieces of shared data SD together with the transfer of the address (S69).

The cloud clipboard coordination module 24 receives the address sent from the server 2 and acquires the shared data SD (S71) by accessing that address (S70). Then, the cloud clipboard coordination module 24 performs a recovery process S72 illustrated in FIG. 10.

Figure 10:
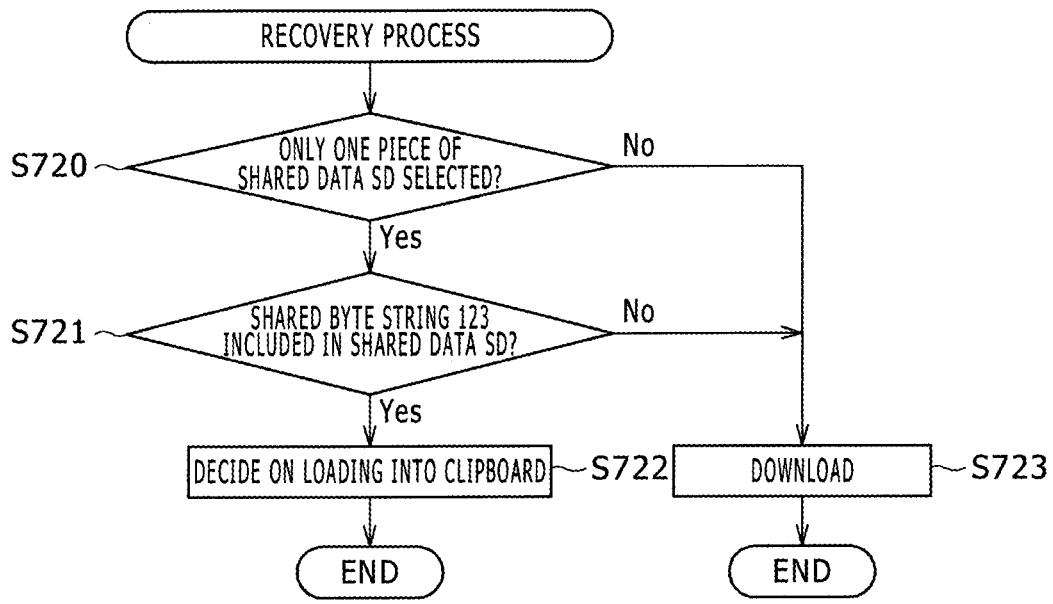
FIG. 10 is a processing flowchart illustrating details of a recovery process illustrated in FIG. 9.

In the recovery process S72, it is determined whether or not only the one piece of shared data SD was selected as illustrated in FIG. 10 (S720). The page P illustrated in FIG. 4 is designed such that only one piece of data can be selected from among the shared data SD that are the partial datasets D2. As a result, the fact that there is the plurality of selected pieces of shared data SD means that the selected shared data SD are files. Therefore, if a negative determination is obtained at S720, the cloud clipboard coordination module 24 performs a downloading process of the shared data SD (S723). In this downloading process, the file that is the shared data SD may be copied to a given folder. Alternatively, the file that is the shared data SD may be copied to the path indicated by the pathname J41 included in the management information J1.

If an affirmative determination is obtained at S720, the cloud clipboard coordination module 24 determines next whether or not the shared data SD includes the shared byte string 123 illustrated in FIG. 3 (S721). If the shared data SD does not include the shared byte string 123, this means that the shared data SD is a file. As a result, the cloud clipboard coordination module 24 proceeds to S723 to perform downloading. On the other hand, if the shared data SD includes the shared byte string 123, this means that the shared data SD is the partial dataset D2. As a result, the cloud clipboard coordination module 24 decides to load the shared data SD into the clipboard 25 (S722).

Referring back to FIG. 9, the cloud clipboard coordination module 24 determines whether or not a decision has been made to load the shared data SD into the clipboard 25 in the recovery process S72 (S73). If the cloud clipboard coordination module 24 determines that a decision has not been made to load the shared data SD, the cloud clipboard coordination module 24 terminates the process. In this case, by referring to the folder to which the shared data SD that is a file has been downloaded, the user can obtain the file. On the other hand, if the cloud clipboard coordination module 24 determines that a decision has been made to load the shared data SD, the cloud clipboard coordination module 24 loads the shared data SD that is the partial dataset D2 into the clipboard 25 (S74). In this case, by instructing the application 22 to paste (S75; e.g., pressing Ctrl and P), the user can read the shared data SD from the clipboard 25 into the application 22 (S76).

As described above, according to the data management system 1 according to the present embodiment, if data stored in the clipboard 25 is a file, the data can be accumulated irrespective of the content. On the other hand, if data stored in the clipboard 25 is the partial dataset D2, the data can be accumulated only when at least one of data objects included in the data is recognizable by a human. Therefore, it is possible to use the storage space of the storage efficiently.

Also, according to the data management system 1 according to the present embodiment, filter information representing a filtering condition applied to the shared data SD that is the partial dataset D2 is sent from the terminal device 4a to the server 2, it is possible to exclude the partial datasets D2 that cannot be used on the terminal device 4a from the list of the shared data SD presented to the terminal device 4a by the server 2.

Also, according to the data management system 1 according to the present embodiment, it is possible for the user of the terminal device 4a to download the shared data SD from the storage 3 by selecting the one or plurality of shared data SD in the presented list. Also, at the time of downloading, it is possible to handle the shared data SD so that the shared data SD that is the partial dataset D2 is loaded into the clipboard 25 and so that the shared data SD that is a file is downloaded to one of the folders.

Figure 11:
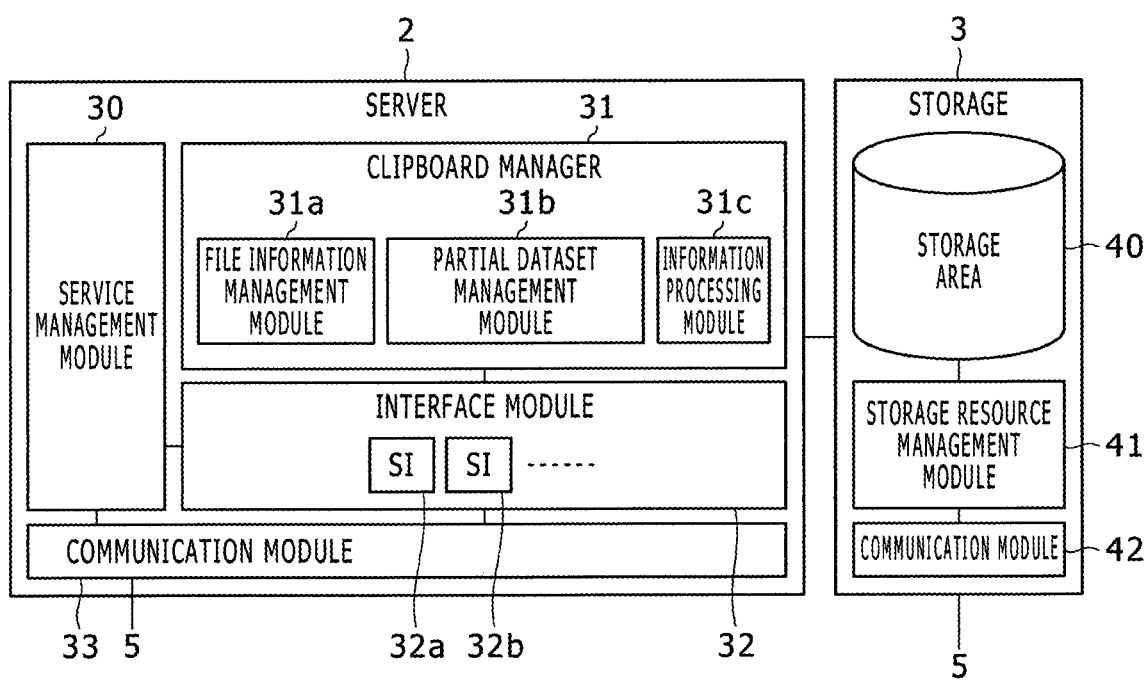
FIG. 11 is a schematic block diagram illustrating functional blocks of the server 2 and the storage 3 according to a second preferred embodiment of the present disclosure.
Figure 12:
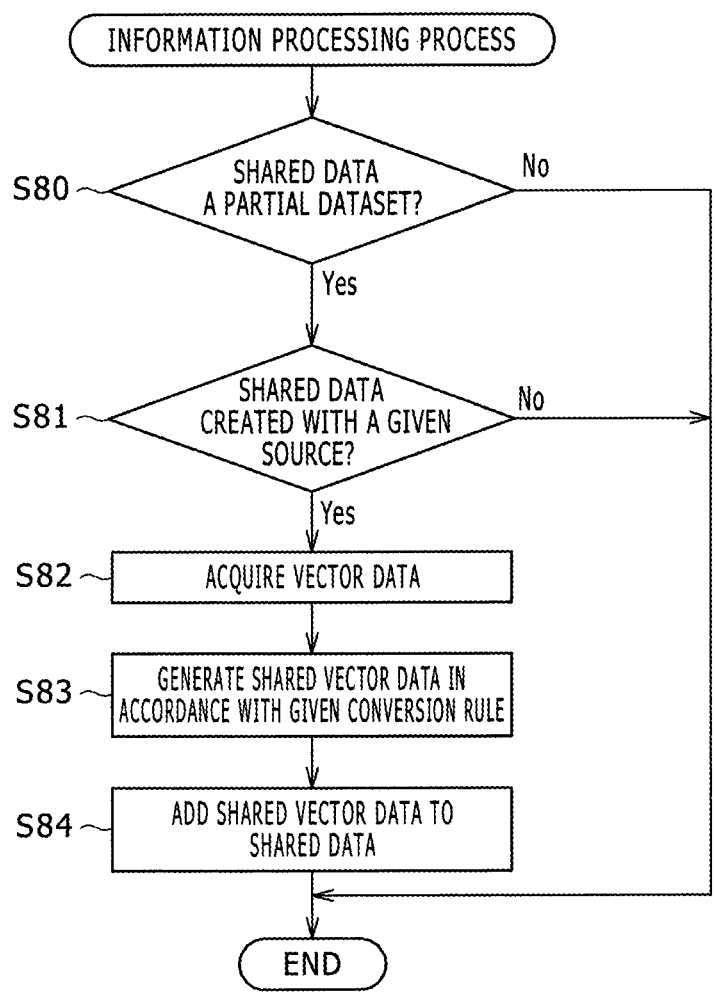
FIG. 12 is a processing flowchart illustrating details of an information processing process executed by an information processing module 31c illustrated in FIG. 11.

A description will be given next of the data management system 1 according to a second embodiment with reference to FIGS. 11 and 12. The data management system 1 according to the present embodiment differs from the data management system 1 according to the first embodiment in that the clipboard manager 31 of the server 2 includes an information processing module 31c and is the same as the data management system 1 according to the first embodiment in all other respects. Therefore, the same components as those of the data management system 1 according to the first embodiment will be denoted by the same reference symbols, and a description will be given below with focus on the differences from the data management system 1 according to the first embodiment.

If the shared data SD that is going to be stored in the storage 3 is the partial dataset D2 and if the shared data SD includes given vector data as one of data objects, the information processing module 31c performs a process of converting the given vector data into other vector data that is more general-purpose than the given vector data from the viewpoint of a difference in operating system and adding the vector data to the shared data SD. Other vector data is, for example, common vector data that is widely used such as SVG, and this process is performed to render vector data in an application-specific format usable in various applications.

A specific description will be given below of an information processing process performed by the information processing module 31c with reference to FIG. 12.

When the shared data SD is received via the interface module 32, the information processing module 31c refers first to the mixed identification information J3 (FIG. 5) in the management information J1 and determines whether the received shared data SD is the partial dataset D2 (S80). As a result, if the received shared data SD is not the partial dataset D2, it is a file, and the information processing module 31c terminates without performing any more particular process. On the other hand, if the received shared data SD is the partial dataset D2, the information processing module 31c checks the source information J5 next and checks whether or not the source information J5 was created with a given source (S81). This check is conducted to check that the vector data included in the shared data SD is recognizable by the information processing module 31c. It is only necessary to determine that the vector data is vector data in the first format created with the given source if the operation system J51 is WINDOWS (registered trademark) and if the application J50 is MICROSOFT EXCEL (registered trademark) or MICROSOFT (registered trademark) WORD.

If a negative determination is obtained at S81, the information processing module 31c terminates without performing any more particular process. On the other hand, if an affirmative determination is obtained at S81, the information processing module 31c acquires vector data from the shared data SD. Then, by converting this vector data in accordance with a given conversion rule, the information processing module 31c generates common vector data (S83) and adds the common vector data to the shared data SD as part of the shared data SD (S84). As a result, common vector data is included in the shared data SD. If this shared data SD is loaded into the clipboard 25 of each of the terminal devices from this moment onward, it is possible to use the vector data irrespective of the operation system of that terminal device or the application installed in that terminal device.

As described above, according to the data management system 1 according to the present embodiment, it is possible to include common vector data in the shared data SD that includes vector data but not common vector data, thus providing a highly general-purpose data management system.

It should be noted that electronic ink described in Patent Document 4, for example, operates in coordination with an application such as MICROSOFT (registered trademark) WORD. However, such electronic ink is not necessarily included in data written to the clipboard 25 by the application. For this reason, when the shared data SD is created on the side of the terminal device 4a, a determination may be made as to whether or not a data object representing an electronic ink is included in the data written to the clipboard 25, digital ink presence/absence information representing the determination result may be included in the source information J5 and sent, and the above process may be performed on the side of the server 2 based on the digital ink presence/absence information.

A description will be given next of the data management system 1 according to a third embodiment with reference to FIGS. 13 and 14A to 14D. The data management system 1 according to the present embodiment differs from the data management system 1 according to the first embodiment in the process through which the terminal device 4a performs a process of generating the shared byte string 123 and is the same as the data management system 1 according to the first embodiment in all other respects. Therefore, the same components as those of the data management system 1 according to the first embodiment will be denoted by the same reference symbols, and a description will be given below with focus on the differences from the data management system 1 according to the first embodiment.

Figure 13:
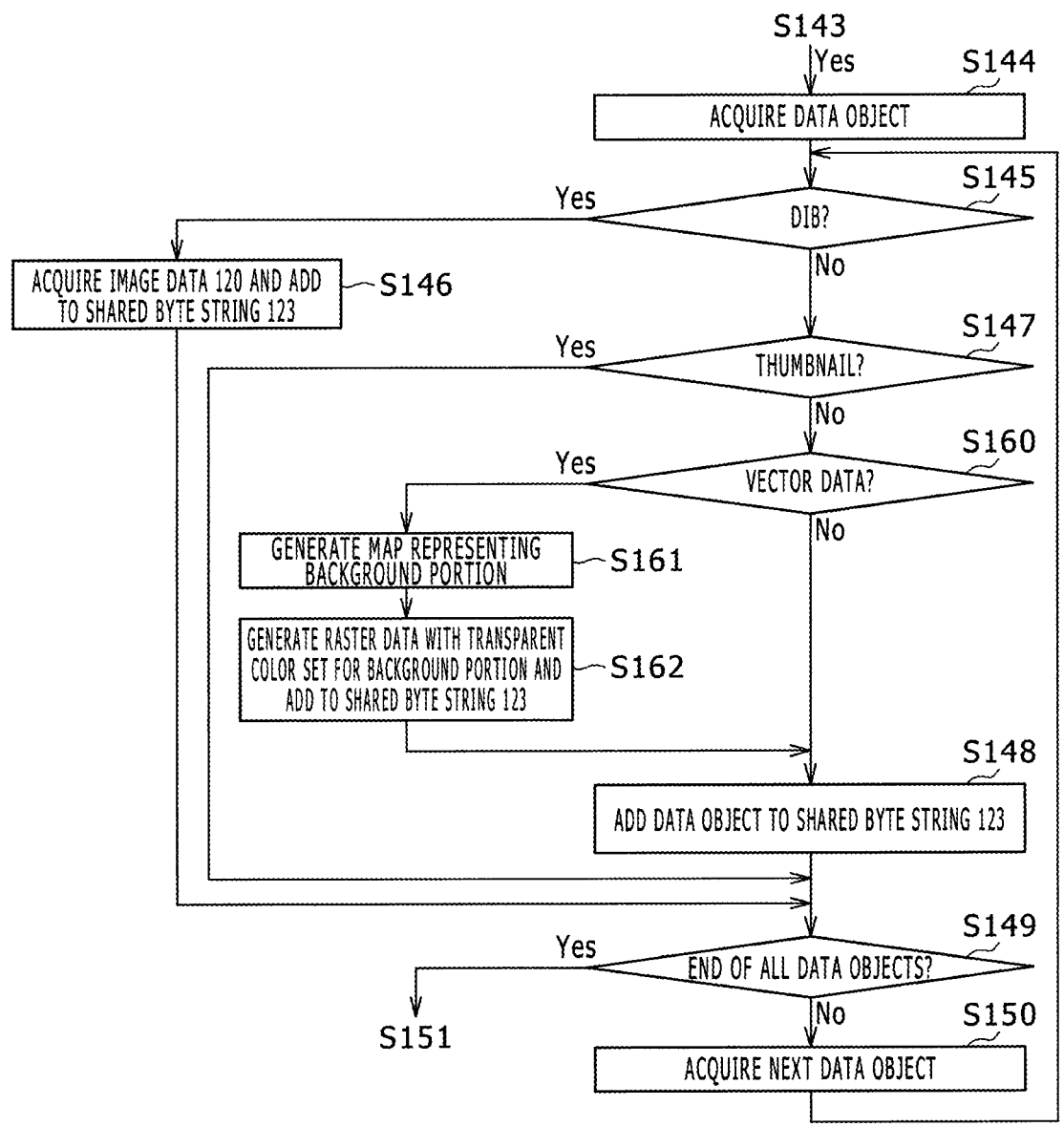
FIG. 13 is a processing flowchart illustrating details of a shared data acquisition process according to a third preferred embodiment of the present disclosure.

As will be understood by comparison between FIG. 8 and FIG. 13, in the present embodiment, S160 to S162 are provided between the negative determination in S147 and S148. S160 to S162 are processes for including, in the shared byte string 123, raster data in which a transparent color is set for a background portion. A detailed description will be given below.

First, at S160, the shared data acquisition module 24a5 illustrated in FIG. 2B determines whether or not the data object to be processed is vector data. If the determination result is an affirmative determination, the shared data acquisition module 24a5 identifies a background portion of the vector data first and generates a map representing the identified background portion (S161).

FIG. 14A is a graphic 200 drawn by vector data, and FIG. 14B is a map 202 representing a background portion 201 of the graphic 200. As can be understood from FIG. 14B, the map 202 is rectangular image data. Also, the background portion 201 is filled with a particular color (e.g., white).

Next, the shared data acquisition module 24a5 generates raster data that is data in PNG format that permits transparency to be set as an image data format and in which a transparent color is set for the background portion of the generated map, and adds the generated raster data to the shared byte string 123 (S162). As a result, it is possible to use this raster data on each of the terminal devices.

Referring again to FIG. 14C shows a stage before transparency (e.g., a transparent color) is set for the background portion 201 of the map 202, and FIG. 14D shows a stage after transparency has been set for the background portion 201 of the map 202. As can be understood from these figures, when transparency is set for the background portion 201, characters are visible through the background portion 201.

As has been described above, according to the data management system 1 according to the present embodiment, it is possible to obtain raster data in which transparency is set as the background from vector data included in the shared data SD. Even in an application that cannot interpret data in that vector data format because of the difference in application or operating system, therefore, it becomes easy to paste graphics as if graphics generated with vector data or native data is pasted.

Although preferred embodiments of the present disclosure have been described above, the present disclosure is in no way restricted by these embodiments, and it is a matter of course that the present disclosure can be implemented in various ways without departing from the scope of the disclosure.

For example, although data held in the clipboard 25 was referred to as data objects in each of the above embodiments, it is possible to treat simple data that is not necessarily treated as objects because of the difference in operating system as data making up part of the shared data SD. For example, the present disclosure is applicable not only to a case in which the operating system treats text data as text data but also to a case in which the operating system treats text data as text data objects.

Also, although the term "clipboard" was used in each of the above embodiments, this is merely illustrative. For example, even if a shared memory area between applications that run on the same operation system of the same terminal is referred to by other term, the present disclosure becomes applicable by treating the shared memory area in the same manner as for the clipboard 25 in each of the above embodiments.

DESCRIPTION OF REFERENCE SYMBOLS

1 Data management system
2 Server
3 Storage
4a to 4c Terminal device
5 Network
10 Network interface card
11 Memory
13 Digitizer
14 Internal bus
20 Application group
21 to 23 Application
22a, 22b, 23a Application programming interface
24 Cloud clipboard coordination module
24a Uploading module
24a1 Data determination module
24a2 Format determination module
24a3 determination condition
24a4 Shared byte string generation module
24a5 Shared data acquisition module
24b Downloading module
25 Clipboard
26, 33, 42 Communication module
30 Service management module
31 Clipboard manager
31a File information management module
31b Partial dataset management module
31c Information processing module
32 Interface module
32a, 32b Service interface
40 Storage area
41 Storage resource management module
42 Communication module
101 to 106 Data object
110 Clip dictionary
120 Image data
122 Raw data
123 Shared byte string
200 Vector data
201 Background portion
202 Map
B1 Paste button
B2 Download button
B3 Delete button
D1 File information
D1a Actual data of file
D2 Partial dataset
J1 Management information
J2 Identification information
J3 Mixed identification information
J4 Meta information
J40 Filename
J41 Pathname
J42 Attribute flag
J43 Category
J44 Owner information
J45 Date/time accessed
J46 Date/time created
J5 Source information
J50 Application
J51 Operation system
J52 Device
J6 Storage information
J60 Shared data storage location
J61 Image data storage location
J62 Thumbnail storage location
P Page
PA Display area of shared data SD that is partial dataset D2
FA Display area of shared data SD that is file

The invention claimed is:

1. A terminal device that uploads data to a storage device that communicates with a server device, the terminal device comprising:
   a processor; and
   a memory coupled to the processor, the memory storing instructions that, when executed by the processor, cause the terminal device to:
     determine whether data to be uploaded is a file or a partial dataset being used by an application;
     determine whether a first data object included in the data to be uploaded that has been determined to be the partial dataset by the terminal device is created in a given format, wherein the first data object is configured to generate image data;
     generate image data from the first data object included in the data to be uploaded that has been determined to be the partial dataset in response to determining that the first data object included in the data to be uploaded that has been determined to be the partial dataset is created in the given format;
     generate raw data by serializing second data objects, wherein the second data objects are included in the data to be uploaded that has been determined to be the partial dataset;
     generate a shared byte string by coupling the image data and the raw data;
     send the data to be uploaded to the storage device as shared data in response to determining that the data to be uploaded is the file; and
     send the generated image data and the generated shared byte string to the storage device as the shared data in response to determining that the data to be uploaded is the partial dataset.

2. The terminal device of claim 1, wherein the memory stores instructions that, when executed by the processor, cause the terminal device to:
   if the data to be uploaded is determined to be the partial dataset by the terminal device, send the image data and the shared byte string to separate storage positions of the storage device.

3. The terminal device of claim 2, wherein
   the storage position where the image data is stored is accessed by the server device to generate thumbnail image data representing content of the shared byte string, and
   the storage position where the shared byte string is stored is accessed by the server device to access the shared byte string whose content is represented by the thumbnail image data.

4. The terminal device of claim 1, wherein the memory stores instructions that, when executed by the processor, cause the terminal device to:
   send, to the server device, mixed identification information indicating whether the shared data is the file or the partial dataset.

5. The terminal device of claim 1, wherein the memory stores instructions that, when executed by the processor, cause the terminal device to:
   if the terminal device determines that the shared data is the partial dataset, acquire source information representing an application type and an operation system type, and send the source information to the server device separately from the shared byte string.

6. The terminal device of claim 1, wherein
the given format is a raster data type format, and the memory stores instructions that, when executed by the processor, cause the terminal device to generate the image data based on the first data object in the raster data type format.

7. The terminal device of claim 6, wherein
the raster data type format includes at least one of a bitmap format, a joint photographic experts group format, a tag image file format, and a graphics interchange format, and
the memory stores instructions that, when executed by the processor, cause the terminal device to generate the image data in one of the bitmap format, the joint photographic experts group format, the tag image file format, and the graphics interchange format that is different from the given format.

8. The terminal device of claim 7, wherein
the memory stores instructions that, when executed by the processor, cause the terminal device to generate the image data in a format that permits transparency to be set.

9. The terminal device of claim 8, wherein
the format that permits transparency to be set is a portable network graphics format.

10. The terminal device of claim 1, wherein the memory stores instructions that, when executed by the processor, cause the terminal device to:
if the terminal device determines that the first data object included in the data to be uploaded that has been determined to be the partial dataset is created in the given format, generate rectangular image data that includes portions other than the first data object included in the data to be uploaded as a background and generate, as the image data, raster data in which transparency is set for a background portion of the generated rectangular image data.

11. The terminal device of claim 1, wherein:
the second data objects do not include thumbnail image data.

12. The terminal device of claim 1, wherein the memory stores instructions that, when executed by the processor, cause the terminal device to:
acquire the data to be uploaded from a clipboard in response to an operation that is different from an operation of updating data in the clipboard.

13. The terminal device of claim 1, wherein the given format is a Device Independent Bitmap (DIB) format.

14. A data management system comprising:
a server device that includes a first processor and a first memory coupled to the first processor;
a terminal device that includes a second processor and a second memory coupled to the second processor, the second memory storing instructions that, when executed by the second processor, cause the terminal device to:
determine whether data to be uploaded is a file or a partial dataset being used by an application;
determine whether a first data object included in the data to be uploaded that has been determined to be the partial dataset by the terminal device is created in a given format, wherein the first data object is configured to generate image data;
generate image data from the first data object included in the data to be uploaded that has been determined to be the partial dataset in response to determining that the first data object included in the data to be uploaded that has been determined to be the partial dataset is created in the given format;
generate raw data by serializing second data objects, wherein the second data objects are included in the data to be uploaded that has been determined to be the partial dataset;
generate a shared byte string by coupling the image data and the raw data;
send the data to be uploaded to a storage device as shared data in response to determining that the data to be uploaded is the file; and
send the generated image data and the generated shared byte string to the storage device as the shared data in response to determining that the data to be uploaded is the partial dataset;
acquire size information of the shared data before sending the shared data to the storage device and send the size information to the server device, wherein the first memory stores instructions that, when executed by the first processor, causes the server device to confirm whether the storage device can store the shared data based on the size information and send information indicating a confirmation result to the terminal device; and
send the shared data in accordance with the information indicating the confirmation result.

15. The data management system of claim 14, wherein the second memory stores instructions that, when executed by the second processor, cause the terminal device to:
send information indicating storage of the shared data in the storage device to the server device after sending the shared data to the storage device.

16. The data management system of claim 14, wherein the first memory stores instructions that, when executed by the first processor, causes the server device to:
if the shared data received from the terminal device is the partial dataset, and if the shared data includes given vector data, convert the given vector data into general-purpose vector data that is compatible with different operating systems, the general-purpose vector data being different from the given vector data.

17. The data management system of claim 14, wherein
the shared data includes mixed identification information indicating whether the shared data is the file or the partial dataset, and
the storage device, in operation, stores the mixed identification information and a portion of the shared data that is the file, or a portion of the shared data that is the shared byte string in separate storage positions.

18. The data management system of claim 14, wherein
the shared data includes source information representing an application that created the shared data, and
the storage device, in operation, stores the source information and the portion of the shared data that is the file, or a portion of the shared data that is the shared byte string in separate storage positions.

19. The data management system of claim 14, wherein the given format is a Device Independent Bitmap (DIB) format.

* * * * *